(12) United States Patent
Kameyama

(10) Patent No.: US 7,751,649 B2
(45) Date of Patent: *Jul. 6, 2010

(54) METHOD, DEVICE AND PROGRAM FOR CUTTING OUT MOVING IMAGE

(75) Inventor: Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,248

(22) Filed: Nov. 18, 2008

(65) Prior Publication Data

US 2009/0074325 A1 Mar. 19, 2009

Related U.S. Application Data

(62) Division of application No. 10/794,299, filed on Mar. 8, 2004, now Pat. No. 7,463,788.

(30) Foreign Application Priority Data

Mar. 7, 2003 (JP) ............................... 2003-061046
Jun. 10, 2003 (JP) ............................... 2003-165026

(51) Int. Cl.
   *G06K 9/36* (2006.01)
(52) U.S. Cl. ...................................... 382/284; 382/283
(58) Field of Classification Search ........................ None
   See application file for complete search history.

(56) References Cited

U.S. PATENT DOCUMENTS

| | | | |
|---|---|---|---|
| 5,111,410 A | 5/1992 | Nakayama et al. | |
| 5,644,508 A | 7/1997 | McNary et al. | |
| 5,937,111 A | 8/1999 | Yamada | |
| 5,960,111 A | 9/1999 | Chen et al. | |
| 6,233,362 B1 | 5/2001 | Takeo et al. | |
| 6,650,766 B1 | 11/2003 | Rogers et al. | |
| 6,665,342 B1 | 12/2003 | Brown et al. | |
| 7,120,297 B2 | 10/2006 | Simard et al. | |
| 7,463,788 B2 * | 12/2008 | Kameyama | 382/284 |
| 2002/0037103 A1 * | 3/2002 | Hong et al. | 382/173 |
| 2003/0048947 A1 | 3/2003 | Grindstaff et al. | |
| 2004/0062439 A1 * | 4/2004 | Cahill et al. | 382/173 |

FOREIGN PATENT DOCUMENTS

| | | |
|---|---|---|
| JP | 5-316418 A | 11/1993 |
| JP | 9-91421 A | 4/1997 |

* cited by examiner

*Primary Examiner*—Charles Kim
(74) *Attorney, Agent, or Firm*—Sughrue Mion, PLLC

(57) ABSTRACT

To enable obtainment of a composite image including a movement trajectory of a moving body, even from a moving image including a background. Sampling means samples frames from moving image data. First mask frame calculating means calculates mask frames including mask regions, which correspond to positions of the moving body on the frames. Second mask frame calculating means accumulates and binarizes the mask frames to calculate a reference mask frame. Region cutout means masks the frames by using the mask frames and the reference mask frame to cut out moving body regions, which correspond to a moving body, from the frames. Composing means overwrites moving body regions on one of the frames in chronological order to obtain a composite image, which includes the movement trajectory of the moving body.

16 Claims, 23 Drawing Sheets

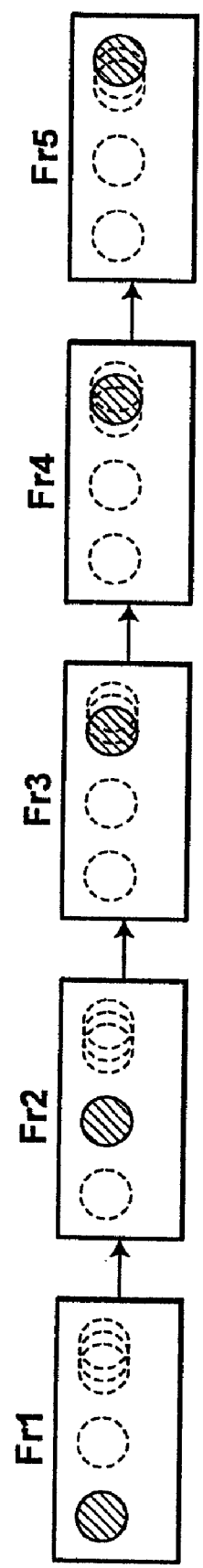

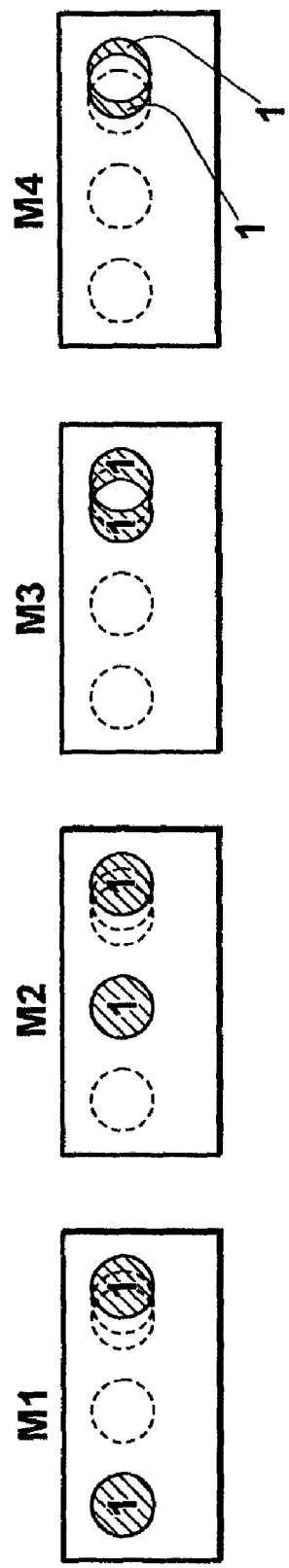

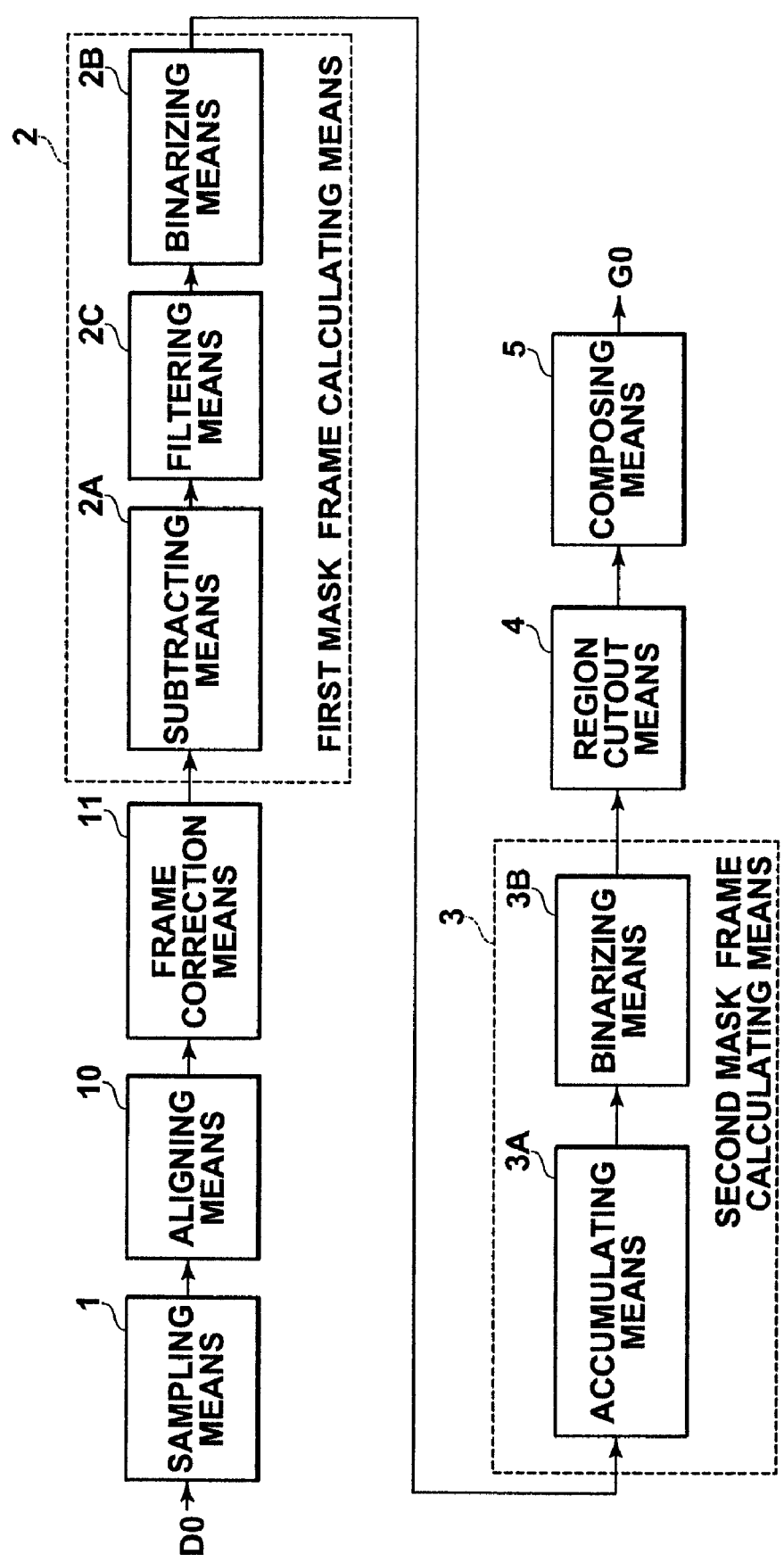

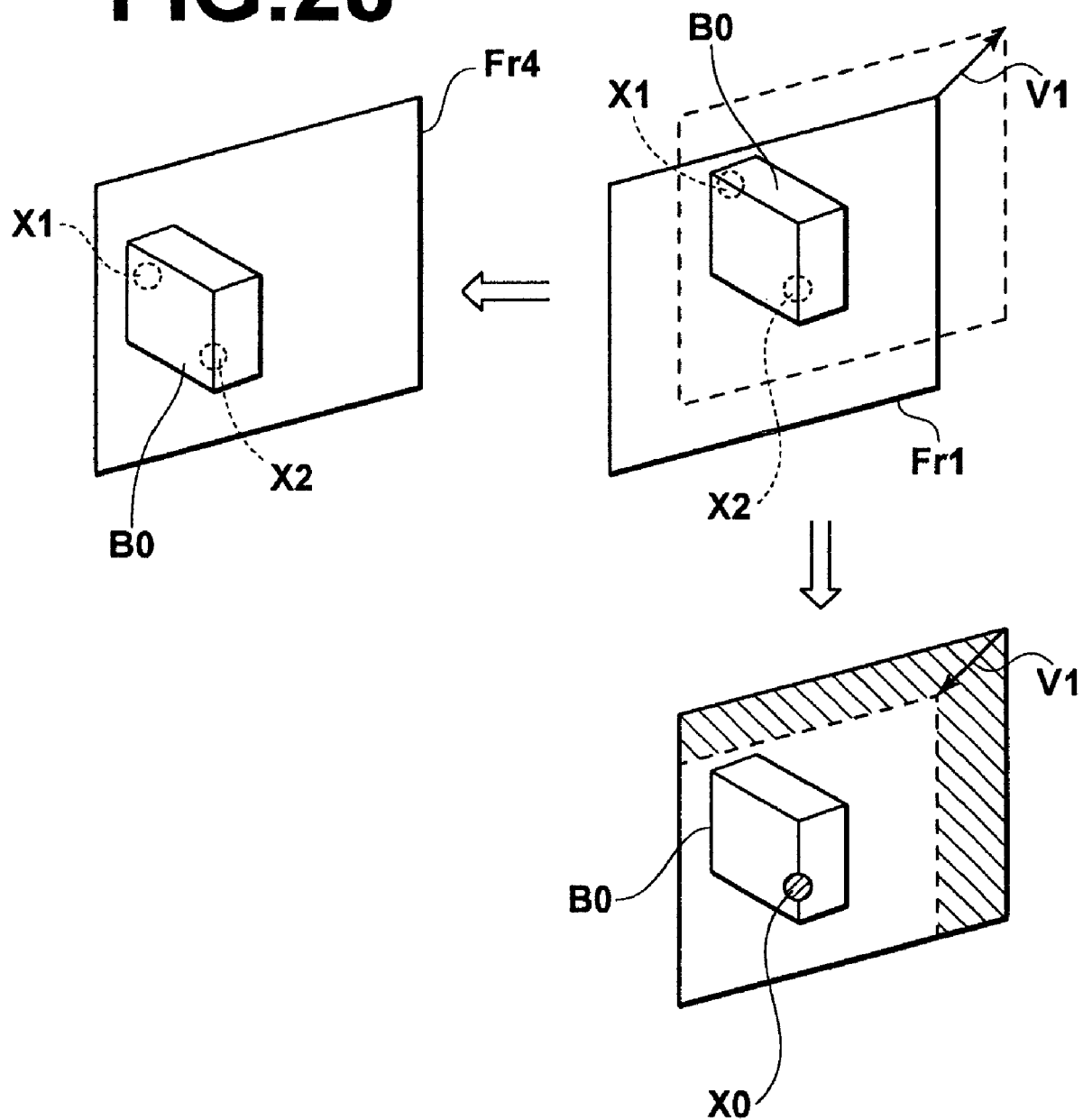

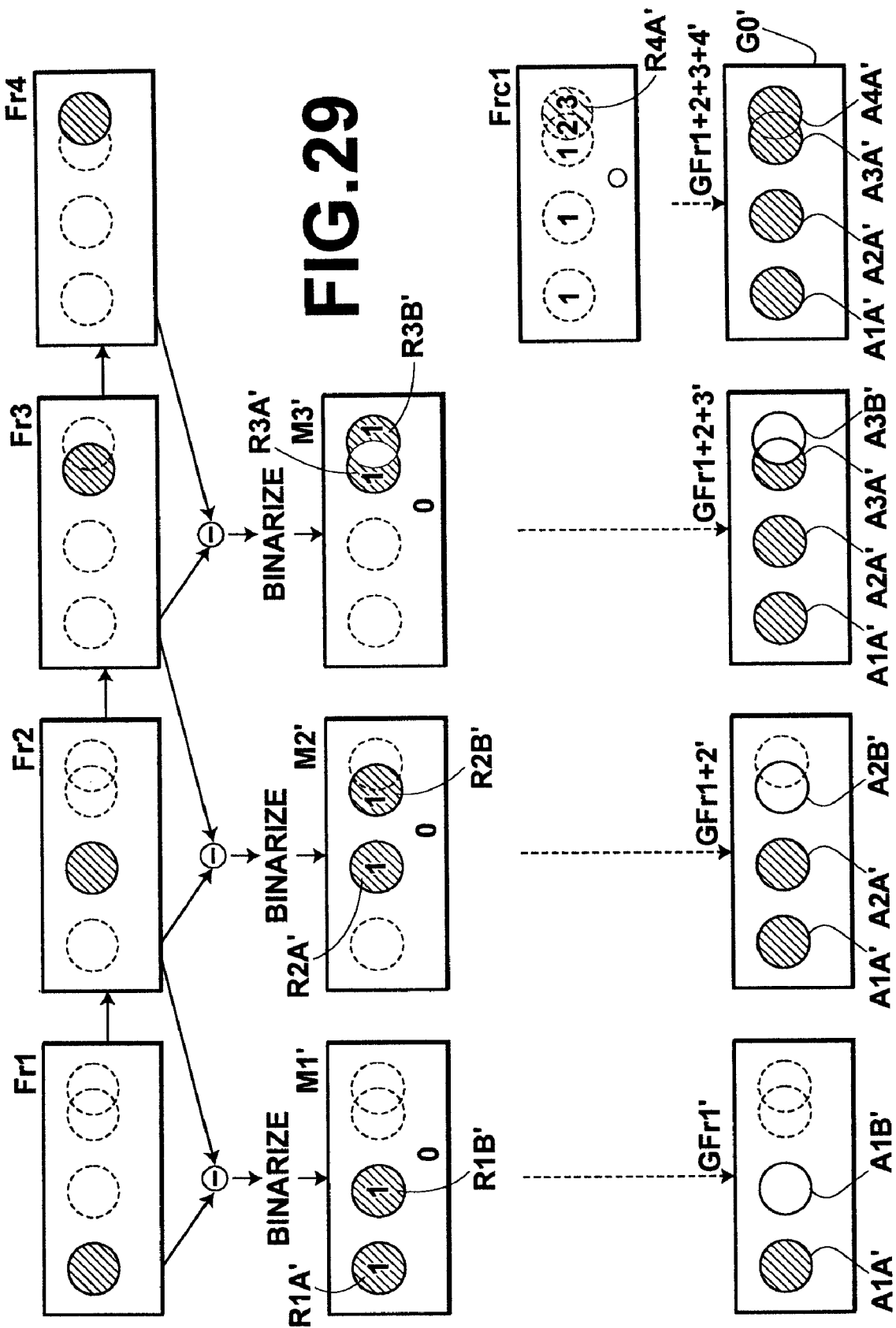

METHOD, DEVICE AND PROGRAM FOR CUTTING OUT MOVING IMAGE

This is a divisional of application Ser. No. 10/794,299 filed Mar. 8, 2004. The entire disclosure(s) of the prior application(s), application Ser. No. 10/794,299 is hereby incorporated by reference.

BACKGROUND OF THE INVENTION

1. Field of the Invention

The present invention relates to a device and a method for cutting out a moving image, which obtain a composite image including a movement trajectory of a moving body by composing a moving body included in each of a plurality of frames sampled from the moving image on one frame, and a program for causing a computer to execute the method for cutting out a moving image.

2. Description of the Related Art

Due to the recent popularization of digital video cameras, it is possible to handle a moving image on a per-frame basis. Moreover, a captured moving image can be imported into a personal computer to be edited and processed as necessary. Furthermore, a method has been proposed to process frames sampled from a moving image so that the movement trajectory of a moving object, in other words, a moving body, may appear in one still image (refer to Japanese Unexamined Patent Publication No. 5(1993)-316418).

In the method disclosed in Japanese Unexamined Patent Publication No. 5 (1993)-316418, differential signals between a reference signal and a plurality of input signals are calculated. The calculated differential signals are added to the reference signal in chronological order to generate composite signals. In the case where this composite signal is obtained, when the moving body overlaps with another, the signal value exceeds an upper limit value of a video signal. In order to prevent this, the differential signals, of which values are halved, are added to the reference signal.

Nevertheless, in the method, the signal used for the composition includes only the moving body without a background. Accordingly, when the method is applied to a plurality of frames, which are obtained by ordinary filming and include both backgrounds and a moving body, the moving body cannot alone be extracted from the frames. As a result, the composite signals including the movement trajectory of the moving body cannot be obtained. In addition, since the differential signals, of which values are halved, are added to the reference signal in the method, regions of the moving body overlap with the backgrounds in a composite image obtained by reproducing the composite signals. Consequently, the contrast of the moving body is reduced.

SUMMARY OF THE INVENTION

The present invention has been devised in consideration of the foregoing circumstances. An object of the present invention is to be able to obtain a composite image including a movement trajectory of a moving body even from a moving image that includes a background.

A device for cutting out a moving image according to the present invention includes:

sampling means for sampling a plurality of sequential frames from the moving image including a moving body;

mask frame calculating means for calculating mask frames, which include mask regions for identifying positions of the moving body in the plurality of frames, corresponding to each of the plurality of frames; and region cutout means for cutting out moving body regions corresponding to the moving body from all or part of the plurality of frames by masking all or part of the plurality of frames using the mask frames which correspond thereto.

In the device for cutting out a moving image according to the present invention, the mask frame calculating means may be a means for calculating other mask frames, which includes the mask regions for identifying the positions of the moving body in other frames, corresponding to each of the other frames by calculating absolute values of difference values in corresponding pixels between a reference frame selected from the plurality of frames and the other frames and binarizing the absolute values based on a first threshold, and the region cutout means may be a means for cutting out the moving body regions corresponding to the moving body from the other frames by masking the other frames using the other mask frames which correspond thereto.

In this case, the mask frame calculating means may filter the absolute values of the difference values to remove noise and binarize the absolute values which are filtered.

Moreover, in this case, the device for cutting out a moving image according to the present invention may further include:

threshold correcting means for calculating a representative value of pixel values indicating a level of the pixel values in each of the plurality of frames to correct the first threshold for each of the absolute values of the difference values based on the representative value, wherein the mask frame calculating means may be a means for binarizing the absolute values based on the first threshold corrected for each of the absolute values of the difference values.

In the device for cutting out a moving image according to the present invention, the mask frame calculating means may include:

first mask frame calculating means for calculating other mask frames, which includes the mask regions for identifying the positions of the moving body in other frames, corresponding to each of the other frames by calculating absolute values of difference values in corresponding pixels between a reference frame selected from the plurality of frames and the other frames and binarizing the absolute values based on a first threshold; and second mask frame calculating means for calculating a reference mask frame, which includes a mask region for identifying a position of the moving body in the reference frame, based on information on the plurality of other mask frames, and the region cutout means may be a means for cutting out a moving body region corresponding to the moving body from the reference frame by masking the reference frame using the reference mask frame.

Meanwhile, in the device for cutting out a moving image according to the present invention, the mask frame calculating means may include:

first mask frame calculating means for calculating other mask frames, which includes the mask regions for identifying the positions of the moving body in other frames, corresponding to each of the other frames by calculating absolute values of difference values in corresponding pixels between a reference frame selected from the plurality of frames and the other frames and binarizing the absolute values based on a first threshold; and second mask frame calculating means for calculating a reference mask frame, which includes a mask region for identifying a position of the moving body in the reference frame, based on information on the plurality of other mask frames, and the region cutout means may be a means for cutting out the moving body regions corresponding to the moving body from the plurality of frames by masking the other frames using the other mask frames which correspond thereto and masking the reference frame using the reference mask frame.

In this case, the first mask frame calculating means may be a means for filtering the absolute values of the difference values to remove noise and binarizing the absolute values which have been filtered.

Various kinds of filters can be used for the filtering, as long as the filters remove noise. Examples of the filters are a low pass filter, a median filter, a maximum value filter, and a minimum value filter.

Moreover, in this case, the device for cutting out a moving image according to the present invention may further include:

threshold correcting means for calculating a representative value of pixel values indicating a level of the pixel values in each of the plurality of frames to correct the first threshold for each of the absolute values of the difference values based on the representative value, wherein the first mask frame calculating means is a means for binarizing the absolute values based on the first threshold corrected for each of the absolute values of the difference values.

When the device for cutting out a moving image according to the present invention includes the second mask frame calculating means, the second mask frame calculating means may be a means for calculating the reference mask frame by accumulating or weighting and accumulating corresponding pixels in a selection mask frame selected from the plurality of other mask frames and further binarizing the accumulated selection mask frame based on a second threshold.

There are cases in which the moving body regions cannot be cut out when the moving body moves slowly and the mask regions become extremely small in the other mask frames and the reference mask frame. Thus, when the device for cutting out a moving image according to the present invention is provided with the second mask frame calculating means, the device may further include selecting means for comparing a size of the mask region in each of the other mask frames with a third threshold to select the other mask frame with the mask region having the size exceeding the third threshold as the selection mask frame.

In addition, the second mask frame calculating means may be a means for filtering the accumulated selection mask frame to remove noise and binarizing the accumulated selection mask frame which has been filtered.

Various kinds of filters can be used for the filtering, as long as the filters remove noise. Examples of the filters are a low pass filter, a median filter, a maximum value filter, and a minimum value filter.

Note that there are cases in which the moving body regions cannot be cut out by using the mask frames and the reference mask frame, when the sampling means samples only two frames or when the moving body moves slowly and there are numerous regions in the accumulated selection mask frame where the moving bodies overlap.

Accordingly, when the device for cutting out a moving image according to the present invention includes the second mask frame calculating means, the second mask frame calculating means may be a means for re-calculating the reference mask frame by calculating color information on a region in the reference frame, which corresponds to the mask region in the reference mask frame; weighting the region in the accumulated selection mask frame, which corresponds to a region having color information similar to the color information; and binarizing the weighted and accumulated selection mask frame based on the second threshold.

Moreover, the device for cutting out a moving image according to the present invention may further include:

inputting means for accepting inputs of a first number of frames, a second number of frames, and a third number of frames, the first number of frames indicating a number of the other frames having a region which corresponds to the moving body and does not overlap with a region corresponding to the moving body in the reference frame, the second number of frame indicating a number of the other frames having a region which corresponds to the moving body and overlaps with the region corresponding to the moving body in the reference frame, and the third number of frames indicating a number of the other frames having regions which correspond to the moving body and overlap with each other, in the case that the plurality of frames are overlapped; and judging means for judging whether a condition the first number of frames>the second number of frames>the third number of frames exists among the first number of frames, the second number of frames, and the third number of frames, which are inputted, and for allowing the region cutout means to cut out the moving body region only when the condition is satisfied.

The device for cutting out a moving image according to the present invention may further include:

aligning means for aligning background regions other than the moving body region in the plurality of frames, wherein the mask frame calculating means may be a means for calculating the mask frame from the plurality of frames after alignment.

The device for cutting out a moving image according to the present invention may further include:

frame correcting means for correcting pixel values of the plurality of frames so that each representative value, such as a mean value or a median value of the pixel values or a maximum frequency value of the histogram, may substantially match another by calculating the representative value of the pixel values, which indicates a level of the pixel values for each of the plurality of frames, wherein the mask frame calculating means may be a means for calculating the mask frames from the plurality of frames after being corrected.

The device for cutting out a moving image according to the present invention may further include composing means for obtaining a composite image of the plurality of frames by overwriting the moving body regions, which are cut out from the plurality of frames by the region cutout means, in chronological order at positions corresponding to the moving body regions in one of the plurality of frames.

A method for cutting out a moving image includes the steps of:

sampling a plurality of sequential frames from the moving image including a moving body;

calculating mask frames, which include mask regions for identifying positions of the moving body in the plurality of frames, corresponding to each of the plurality of frames; and cutting out moving body regions corresponding to the moving body from all or part of the plurality of frames by masking all or part of the plurality of frames using the mask frames which correspond thereto.

Note that the method for cutting out a moving image according to the present invention may be provided as a program for causing a computer to execute the method.

According to the present invention, the sampling means samples the plurality of sequential frames from the moving image. The mask frame calculating means calculates the mask frames, which include the mask regions for identifying the positions of the moving body in the plurality of frames, corresponding to each of the plurality of frames. Herein, the mask regions correspond to the moving body regions in the frames. The region cutout means masks all or part of the plurality of frames by using the mask frames, which correspond thereto, to cut out the moving body regions corresponding to the moving body from the all or part of the plurality of frames.

Accordingly, it is possible to cut out the moving body regions from the frames appropriately even when the moving image includes both the background and the moving body. Thus, the composite image including the movement trajectory of the moving body can be easily obtained by using the cutout moving body regions.

The mask frame calculating means and the region cutout means perform relatively simple processes. The mask frame calculating means calculates the mask frames, which include the mask regions, of the plurality of frames. The region cutout means performs the masking. Consequently, it is possible to cut out the moving body regions easily from the frames.

In the device for cutting out a moving image according to the present invention, the mask frame calculating means and the region cutout means may perform the processes as in the second aspect of the present invention. The mask frame calculating means may calculate the other mask frames, which include the mask regions for identifying the positions of the moving body in the other frames, corresponding to each of the other frames by calculating the absolute values of the difference values in the corresponding pixels between the reference frame selected from the plurality of frames and the other frames and binarizing the absolute values based on the first threshold. The region cutout means may cut out the moving body regions corresponding to the moving body from the other frames by masking the other frames using the other mask frames which correspond thereto.

Accordingly, it is possible to cut out the moving body regions from the other frames appropriately even when the moving image includes both the background and the moving body. Thus, the composite image including the movement trajectory of the moving body can be easily obtained by using the cutout moving body regions.

The mask frame calculating means and the region cutout means perform relatively simple processes. The mask frame calculating means calculates and binarizes the absolute values of the difference values. The region cutout means performs the masking. Consequently, it is possible to cut out the moving body regions easily from the other frames.

According to the device for cutting out a moving image of the third aspect of the present invention, the mask frame calculating means filters the absolute values of the difference values to remove noise and binarizes the filtered absolute values. Herein, the regions having relatively large absolute values originally correspond to the moving body included in the reference frame and the other frames. However, each frame includes noise upon filming and noise due to the movement of the moving body, and thus small regions having small absolute values are occasionally included in the regions having relatively large absolute values. On the contrary, small regions having relatively large absolute values are occasionally included in the regions having small absolute values. Thus, by filtering the absolute values of the difference values to remove noise, it is possible to remove noise due to these small regions from the absolute values. Therefore, the other mask frames can be precisely calculated while the effects of the noise are reduced.

In the device for cutting out a moving image according to the present invention, the first mask frame calculating means, the second mask frame calculating means, and the region cutout means may perform the processes as in the fifth aspect of the present invention. The first mask frame calculating means may calculate the other mask frames, which include the mask regions for identifying the positions of the moving body in the other frames, corresponding to each of the other frames by calculating the absolute values of the difference values in the corresponding pixels between the reference frame selected from the plurality of frames and the other frames and binarizing the absolute values based on the first threshold. The second mask frame calculating means may calculate the reference mask frame based on the information on the plurality of other frames. The region cutout means may cut out the moving body region corresponding to the moving body from the reference frame by masking the reference frame using the reference mask frame.

Accordingly, it is possible to cut out the moving body region from the reference frame appropriately even when the moving image includes both the background and the moving body. Thus, the composite image including the movement trajectory of the moving body can be easily obtained by using the cutout moving body region.

The first mask frame calculating means, the second mask frame calculating means, and the region cutout means perform relatively simple processes. The first mask frame calculating means calculates and binarizes the absolute values of the difference values. The second mask frame calculating means performs the accumulation and the binarization. The region cutout means performs the masking. Consequently, it is possible to cut out the moving body region easily from the reference frame.

In the device for cutting out a moving image according to the present invention, the mask frame calculating means may include the first mask frame calculating means and the second mask frame calculating means as in the sixth aspect of the present invention. The first mask frame calculating means calculates the other mask frames, which include the mask regions for identifying the positions of the moving body in the other frames, corresponding to each of the other frames by calculating the absolute values of the difference values in the corresponding pixels between the reference frame selected from the plurality of frames and the other frames and binarizing the absolute values based on the first threshold. The second mask frame calculating means calculates the reference mask frame, which includes the mask region for identifying the position of the moving body in the reference frame, based on the information on the plurality of mask frames. This makes it possible to calculate the other mask frames by simple processes such as the calculation and binarization of the absolute values of the difference values.

According to the device for cutting out a moving image of the seventh aspect of the present invention, the first mask frame calculating means filters the absolute values of the difference values to remove noise and binarizes the filtered absolute values. Herein, the regions having relatively large absolute values originally correspond to the moving body included in the reference frame and the other frames. However, each frame includes noise upon filming and noise due to the movement of the moving body, and thus small regions having small absolute values are occasionally included in the regions having relatively large absolute values. On the contrary, small regions having relatively large absolute values are occasionally included in the regions having small absolute values. Thus, by filtering the absolute values of the difference values to remove noise, it is possible to remove noise due to these small regions from the absolute values. Therefore, the other mask frames can be precisely calculated while the effects of the noise are reduced.

According to the device for cutting out a moving image of the fourth and eighth aspects of the present invention, the threshold correcting means calculates a representative value of pixel values indicating a level of the pixel values for each of the plurality of frames and corrects the first threshold for each of the absolute values of the difference values based on the representative value. The mask frame calculating means or the first mask frame calculating means binarizes the absolute values based on the first threshold corrected for each of the absolute values of the difference values. Herein, when the contrast adjusting function of a video camera used for filming the moving image does not work well or when it becomes suddenly cloudy during outdoor filming in fine weather, the entire contrast differs between the sampled frames. Thus, when the mask frame calculating means or the first mask frame calculating means calculates the absolute values of the difference values between the corresponding pixels in the reference frame and the other frames by using such frames, the absolute values will become relatively large even in the background regions which do not correspond to the moving body. Therefore, it is impossible to accurately calculate the mask frames having mask regions which correspond to only the moving body by the binarization.

Thus, the first threshold is corrected for each of the absolute values of the difference values to perform the binarization as in the device for cutting out a moving image of the fourth and eighth aspects of the present invention. This makes it possible to appropriately calculate the mask frames having the mask regions which correspond to only the moving body, even when the absolute values are relatively large.

When the device for cutting out a moving image is provided with the second mask frame calculating means, the second mask frame calculating means calculates the reference mask frame by accumulating the corresponding pixels in the selection mask frame selected from the plurality of other frames and binarizing the accumulated selection mask frame based on the second threshold. This makes it possible to calculate the reference mask frame by the simple processes including the accumulation and the binarization.

There are cases in which the mask region in the reference mask frame does not correspond to the moving body region included in the frame when the moving body moves slowly and the mask regions become extremely small in the other mask frames. Hence, as in the device for cutting out a moving image of the tenth aspect of the present invention, the selecting means compares the size of the mask region in each of the other mask frames with the third threshold and selects the other mask frame having the mask region with a size exceeding the third threshold as the selection mask frame. This makes it possible to calculate the reference mask frame including the mask region which corresponds to the moving body region.

According to the device for cutting out a moving image of the eleventh aspect of the present invention, the second mask frame calculating means filters the accumulated selection mask frame to remove noise and binarizes the filtered selection mask frame. Herein, the regions having relatively large absolute values in the accumulated selection mask frames originally correspond to the moving body included in the reference frame and the other frames. However, each frame includes noise upon filming and noise due to the movement of the moving body, and thus small regions having small values in the accumulated selection mask frame are occasionally included in the regions having relatively large absolute values in the accumulated selection mask frame. On the contrary, small regions having relatively large values in the accumulated selection mask frame are occasionally included in the regions having small values in the accumulated selection mask frame. Thus, by filtering the accumulated selection mask frame to remove noise, it is possible to remove noise due to these small regions from the accumulated selection mask frame. Therefore, the reference mask frame can be precisely calculated while the effects of the noise are reduced.

As in the twelfth aspect of the present invention, the color information on the region in the reference frame, which corresponds to the mask region in the reference mask frame, is calculated. The region in the accumulated selection mask frame, which corresponds to the region having the color information similar to the color information, is weighted. The weighted and accumulated selection mask frame is binarized based on the second threshold to re-calculate the reference mask frame. Therefore, it is possible to ensure that the moving body region corresponding to the moving body is cut out from the reference frame.

Assume a case in which the plurality of frames are overlapped. The first number of frames is defined as the number of other frames having regions which correspond to a moving body and do not overlap with the region corresponding to the moving body in the reference frame. The second number of frames is defined as the number of other frames having regions which correspond to the moving body and overlap with the regions corresponding to the moving body in the reference frame. The third number of frames is defined as the number of other frames having regions which correspond to the moving body and overlap with each other. Only when the condition the first number of frames>the second number of frames>the third number of frames is satisfied, it is possible to cut out the moving body regions from all the frames. Thus, as in the device for cutting out the moving image according to the thirteenth aspect of the present invention, if the inputting means accepts the inputs of the first to third numbers of frames, the judging means judges whether the condition the first number of frames>the second number of frames>the third number of frames is satisfied, and the region cutout means cuts out the moving body regions only when the condition is satisfied, it is possible to ensure that the moving body regions corresponding to the moving body are cut out from the frames.

According to the device for cutting out a moving image of the fourteenth aspect of the present invention, the aligning means aligns the background regions in the plurality of frames and the mask frame calculating means calculates the mask frames from the plurality of aligned frames. Accordingly, it is possible to remove the effects of the movement of the backgrounds, due to wobbling or the like upon filming, from the frames. Therefore, the moving body regions can be accurately cut out from the frames while the effects of the movement of the background regions are eliminated.

According to the device for cutting out a moving image of the fifteenth aspect of the present invention, the frame correcting means calculates a representative value of pixel values indicating a level of the pixel values for each of the plurality of frames and corrects the pixel values of the plurality of frames to substantially correspond to the representative value. The mask frame calculating means calculates the mask frames from the corrected frames. Herein, when the contrast adjusting function of a video camera used for filming the moving image does not work well or when it becomes suddenly cloudy during outdoor filming in fine weather, the entire contrast differs between the sampled frames. Thus, when the mask frame calculating means calculates the absolute values of the difference values in the corresponding pixels between the reference frame and the other frames by using such frames, the absolute values will become relatively large even in the background regions which do not correspond to the moving body. Therefore, it is impossible to accurately calculate the mask frames having mask regions which correspond to only the moving body.

Consequently, as in the device for cutting out a moving image of the fifteenth aspect of the present invention, by correcting the pixel values of the plurality of frames, the entire contrast in each frame can be substantially the same. As a result, the absolute values will not be extremely large in the background regions, which do not correspond to the moving body. Therefore, it is possible to accurately calculate the mask frames having mask regions which correspond to only the moving body.

According to the device for cutting out a moving image of the sixteenth aspect of the present invention, the composing means overwrites the moving body regions at the positions in chronological order. These moving body regions correspond to all or part of the plurality of frames cut out by the region cutout means, and the positions in one of the plurality of frames correspond to the moving body regions. Thus, a composite image including the movement trajectory of the moving body can be obtained without reducing the contrast between the moving body and the background.

BRIEF DESCRIPTION OF THE DRAWINGS

FIG. 12 is a diagram showing examples of sampled frames.

FIG. 13 is a diagram showing mask frames.

FIG. 21 is a schematic block diagram showing the configuration of a system for composing a moving image according to a fifth embodiment of the present invention, which includes a device for cutting out a moving image.

FIG. 28 is a diagram for explaining the alignment by aligning means in an eighth embodiment.

FIG. 29 is a diagram for explaining the process performed in a ninth embodiment by using frames.

DESCRIPTION OF THE PREFERRED EMBODIMENTS

Figure 1:
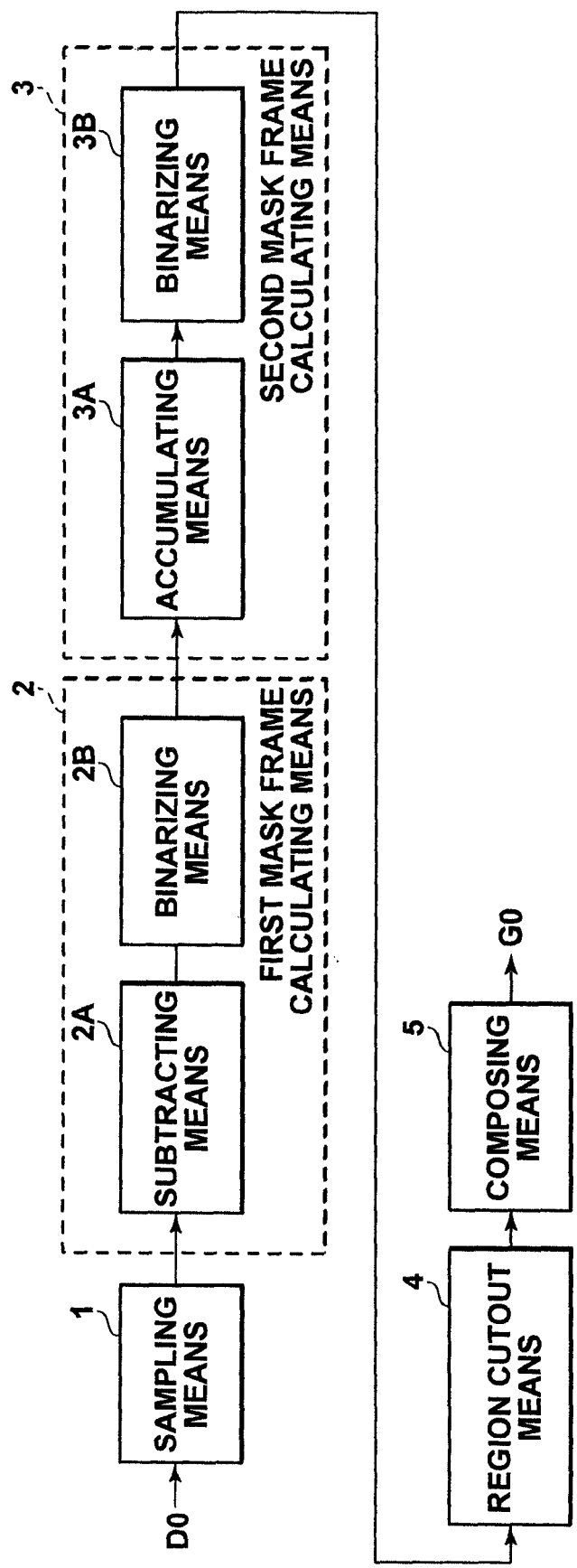
FIG. 1 is a schematic block diagram showing the configuration of a system for composing a moving image according to a first embodiment of the present invention, which includes a device for cutting out a moving image.

Hereinafter, embodiments of the present invention are described with reference to the drawings. FIG. 1 is a schematic block diagram showing the configuration of a system for composing a moving image according to a first embodiment of the present invention, which includes a device for cutting out a moving image. As shown in FIG. 1, the system for composing a moving image according to the first embodiment of the present invention comprises sampling means 1, first mask frame calculating means 2, second mask frame calculating means 3, region cutout means 4, and composing means 5.

Figure 2:
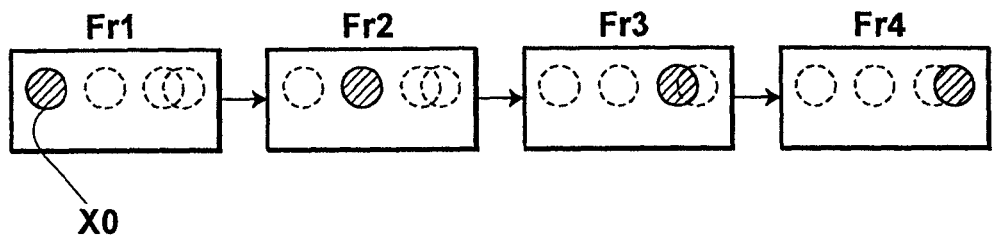
FIG. 2 is a diagram showing examples of sampled frames.

The sampling means 1 samples a plurality of frames Fri (i=1 to N) from inputted moving image data D0. In the first embodiment, four frames Fr1 to Fr4 are sampled from the moving image data D0 as shown in FIG. 2. The moving image data D0 represents a moving image, in which a circular moving body X0 is moving. Note that the value of i increases for the frame Fri as time elapses.

The first mask frame calculating means 2 comprises subtracting means 2A and binarizing means 2B.

The subtracting means 2A calculates absolute values $|di(x, y)|$ (i=1 to 3) of difference values in corresponding pixels between a reference frame (in the first embodiment, the frame Fr4), which is selected from the plurality of frames Fr1 to Fr4, and other frames Fr1 to Fr3 by using the following equation (1):

$$|di(x, y)| = |Fri(x, y) - Fr4(x, y)| \tag{1}$$

where (x, y) are coordinates of corresponding pixels between the frames Fri and Fr4.

Color data RGB or luminance and chrominance data YCC form the moving image data D0 and the frames Fr1 to Fr4. Accordingly, absolute values of difference values between the reference frame Fr4 and the other frames Fr1 to Fr3 are calculated in terms of each component of RGB or YCC. After each component is weighted, the Euclidean distance is obtained for each component and may be used as an absolute value of the difference value. For example, when the luminance and chrominance data YCC form the frames Fr1 to Fr4, the absolute value |di (x, y)| of the difference value in each pixel position is calculated by using the following equation (2):

$$|di(x, y)| = \sqrt{(|a \cdot Yd(x, y)|^2 + |b \cdot Cbd(x, y)|^2 + |c \cdot Crd(x, y)|^2} \tag{2}$$

where Yd is an absolute value of a difference value calculated for luminance Y, Cbd is an absolute value of a difference value calculated for chrominance Cb, and Crd is an absolute value of a difference value calculated for chrominance Cr.

Figure 3:
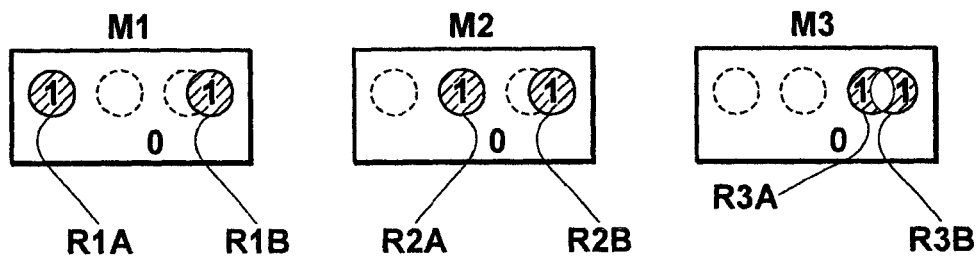
FIG. 3 is a diagram showing mask frames.

The binarizing means 2B binarizes the absolute value |di (x, y)| of the difference value based on a threshold Th1. Specifically, a value of 1 is given to a pixel having the absolute value |di (x, y)| of a difference value larger than the threshold Th1. A value of 0 is given to a pixel having the absolute value less than or equal to the threshold Th1. Mask frames M1 to M3, which include pixels with a value of 1 as mask regions and correspond to the other frames Fr1 to Fr3, are calculated. The mask frames M1 to M3 thus calculated are shown in FIG. 3. Note that shaded areas indicate the mask regions in FIG. 3. The mask frame M1 has mask regions R1A and R1B. The mask frame M2 has mask regions R2A and R2B. The mask frame M3 has mask regions R3A and R3B. Herein, the mask regions R1A, R2A and R3A of the mask frames M1 to M3 correspond to regions of the moving body X0 in the frames Fr1 to Fr3, respectively. The mask regions R1B, R2B, and R3B correspond to a region of the moving body X0 in the reference frame Fr4.

The second mask frame calculating means 3 comprises accumulating means 3A and binarizing means 3B.

The accumulating means 3A accumulates the corresponding pixels in all the mask frames M1 to M3 to calculate a cumulative frame Frc by using the equation (3) below. Note that all the mask frames M1 to M3 are selected for the calculation of the undermentioned reference mask frame Frc1 in the first embodiment.

$$Frc(x,y) = \Sigma Mi(x, y) \ (i=1 \ to \ 3) \tag{3}$$

Note that the mask frames M1 to M3 may be weighted and accumulated to calculate the reference mask frame Frc1.

Figure 4:
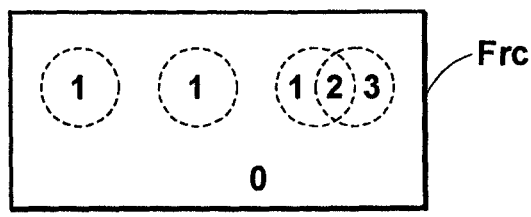
FIG. 4 is a diagram showing a cumulative frame.

FIG. 4 is a diagram showing the cumulative frame Frc. As shown in FIG. 4, in the cumulative frame Frc, a region, which corresponds to only the mask region R1A of the mask frame M1, has a value of 1. A region, which corresponds to only the mask region R2A of the mask frame M2, has a value of 1. A region, which corresponds to only the mask region R3A of the mask frame M3, has a value of 1. A region, which corresponds to both the mask region RIB of the mask frame M1 and the mask region R2B of the mask frame M2 (i.e., a region having a value of 0, where the mask regions R3A and R3B overlap in the mask frame M3), has a value of 2. A region, which corresponds to the mask region R1B of the mask frame M1, the mask region R2B of the mask frame M2, and the mask region R3B of the mask frame M3, has a value of 3.

Figure 5:
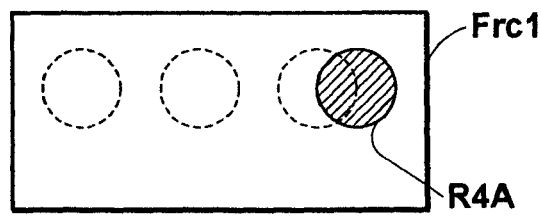
FIG. 5 is a diagram showing a reference mask frame.

The binarizing means 3B binarizes the cumulative frame Frc based on a threshold Th2. Herein, for example, the threshold Th2 is set to a value of 1 (when the total number of frames-k, k=3). When a pixel value in the cumulative frame Frc exceeds the threshold Th2, a value of 1 is given to the pixel. When a pixel value is less than or equal to the threshold Th2, a value of 0 is given to the pixel. Thereafter, a reference mask frame Frc1 is calculated, in which a pixel having a value of 1 is set to be a mask region. This calculated reference mask frame Frc1 is shown in FIG. 5. Note that a shaded area, a region R4A, represents a mask region in FIG. 5. Note that the mask region in the reference mask frame Frc1 corresponds to the region of the moving body X0 in the reference frame Fr4.

The region cutout means 4 masks the frames Fr1 to Fr3 by using the corresponding mask frames M1 to M3. The region cutout means 4 also masks the reference frame Fr4 by using the reference mask frame Frc1. Accordingly, the region cutout means 4 cuts out a moving body region corresponding to the moving body X0 from each of the plurality of frames Fr1 to Fr4. Specifically, as for the frame Fr1, regions, which correspond to the mask regions R1A and R1B having the pixel values of 1 in the mask frame M1, are cut out as moving body regions A1A and A1B (hereinafter, generically referred to as A1 occasionally). As for the frame Fr2, regions, which correspond to the mask regions R2A and R2B having the values of 1 in the mask frame M2, are cut out as moving body regions A2A and A2B (hereinafter, generically referred to as A2 occasionally). As for the frame Fr3, regions, which correspond to the mask regions R3A and R3B having the values of 1 in the mask frame M3, are cut out as moving body regions A3A and A3B (hereinafter, generically referred to as A3 occasionally).

Note that the moving body regions A1B, A2B, and A3B correspond to background regions in the frames Fr1 to Fr3, instead of the regions of the moving body X0. Thus, the cutout moving body regions A1B, A2B, and A3B have substantially the same image.

Meanwhile, as for the reference frame Fr4, a region, which corresponds to the mask region R4A having the value of 1 in the reference mask frame Frc1, is cut out as a moving body region A4A (hereinafter, referred to as A4 occasionally).

The composing means 5 overwrites the moving body regions A1 to A4 in chronological order at positions corresponding to the moving body regions A1 to A4 in one of the frames Fr1 to Fr4 (herein, Fr1). Thus, the composing means 5 obtains a composite image G0 of the plurality of frames Fr1 to Fr4.

Figure 6:
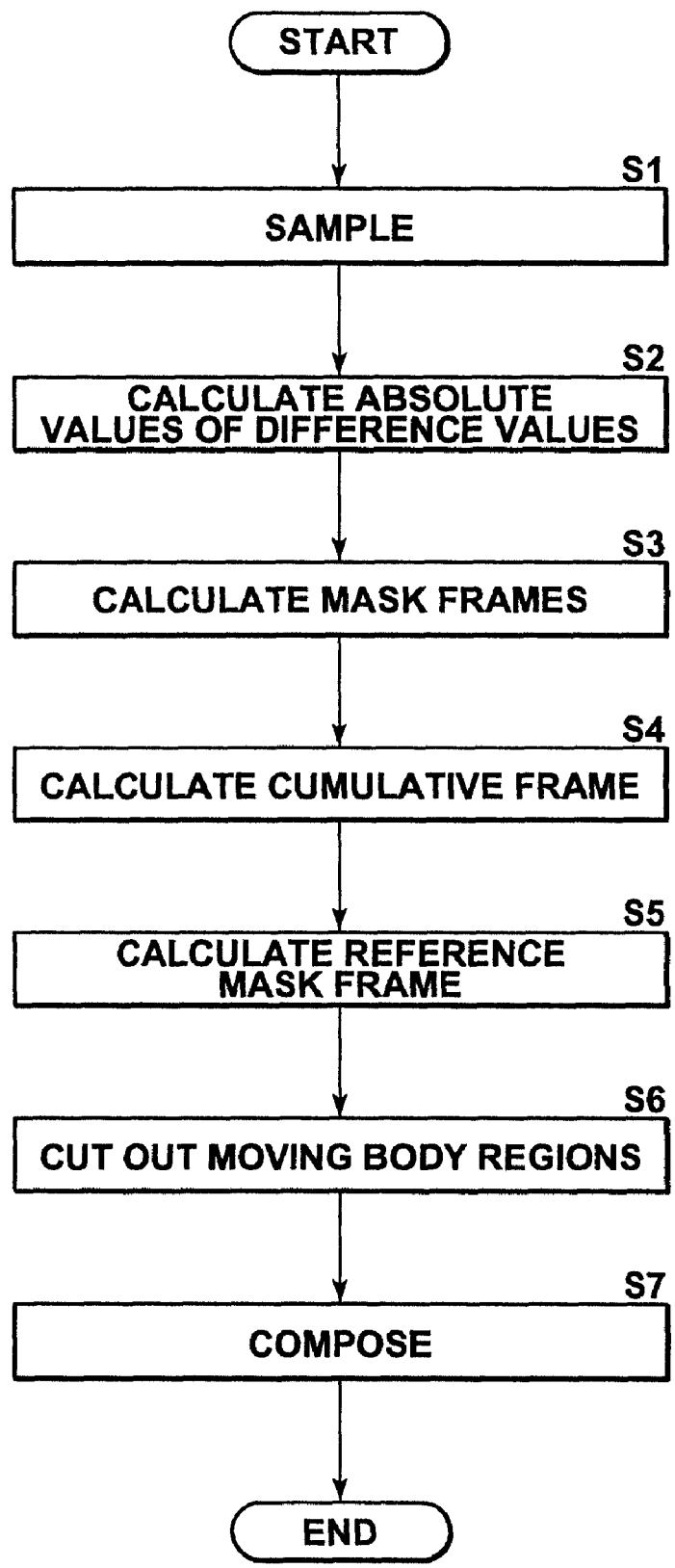
FIG. 6 is a flow chart showing the process performed in the first embodiment.
Figure 7:
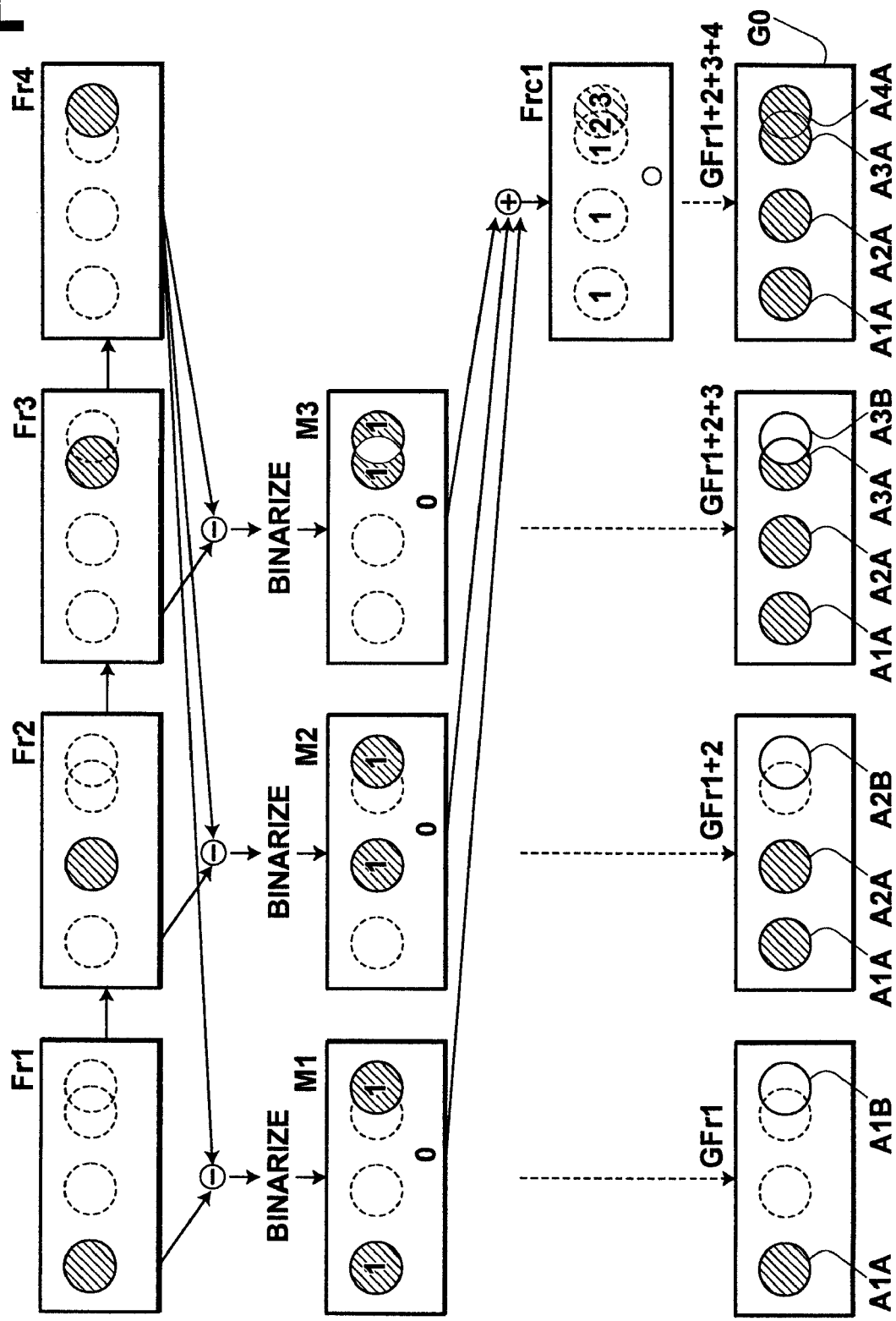
FIG. 7 is a diagram for explaining the process performed in the first embodiment by using frames.

Next, the process performed in the first embodiment is described. FIG. 6 is a flow chart showing the process performed in the first embodiment. FIG. 7 is a diagram for explaining the process performed in the first embodiment by using the frames. First, the sampling means 1 samples the four frames Fr1 to Fr4 from the moving image data D0 (Step S1). Second, the subtracting means 2A of the first mask frame calculating means 2 calculates the absolute values |di (x, y)| of the difference values in the corresponding pixels between the reference frame Fr4 and the other frames Fr1 to Fr3 (Step S2). Third, the binarizing means 2B binarizes the absolute values of the difference values based on the threshold Th1 to calculate the mask frames M1 to M3 (Step S3).

Fourth, the accumulating means 3A of the second mask frame calculating means 3 accumulates the corresponding pixels in all the mask frames M1 to M3 to calculate the cumulative frame Frc (Step S4). Fifth, the binarizing means 3B binarizes the cumulative frame Frc based on the threshold Th2 to calculate the reference mask frame Frc1 (Step S5).

Sixth, the region cutout means 4 masks the frames Fr1 to Fr3 by using the corresponding mask frames M1 to M3. The region cutout means 4 also masks the reference frame Fr4 by using the reference mask frame Frc1. Accordingly, the region cutout means 4 cuts out the moving body regions A1 to A4, which correspond to the moving body X0, from the plurality of frames Fr1 to Fr4 (Step S6).

Seventh, the composing means 5 overwrites the moving body regions A1 to A4 in chronological order at the positions corresponding to the moving body regions A1 to A4 in the frame Fr1, one of the frames Fr1 to Fr4. Thus, the composing means 5 obtains the composite image G0 of the plurality of frames Fr1 to Fr4 (Step S7). Hence, the process is completed.

Specifically, a first composite image GFr1 is obtained by overwriting the moving body regions A1A and A1B, which are cut out from the frame Fr1, on the frame Fr1, as shown in the lowermost row in FIG. 7. In the first embodiment, since the moving body regions A1 to A4 are overwritten on the frame Fr1, overwriting the moving body regions A1A and A1B onto the frame Fr1 can be omitted. Note that the moving body region A1A corresponds to the region of the moving body X0 in the frame Fr1, and the moving body region A1B corresponds to the region of the moving body X0 in the frame Fr4.

Next, a second composite image GFr1+2 is obtained by overwriting the moving body regions A2A and A2B, which are cut out from the frame Fr2, on the first composite image GFr1. Note that the moving body region A2A corresponds to the region of moving body X0 in the frame Fr2, and the moving body region A2B corresponds to the region of the moving body X0 in the frame Fr4. Consequently, the moving body region A2B is overwritten on the moving body region A1B in the composite image GFr1. However, since the moving body regions A1B and A2B represent approximately the same image, the image in the moving body region A1B will not be substantially changed in the composite image GFr1.

Subsequently, a third composite image GFr1+2+3 is obtained by overwriting the moving body regions A3A and A3B, which are cut out from the frame Fr3, on the second composite image GFr1+2. Note that the moving body region A3A corresponds to the region of the moving body X0 in the frame Fr3, and the moving body region A3B corresponds to the region of the moving body X0 in the frame Fr4. Accordingly, the moving body region A3B is overwritten on the moving body region A2B partially in the composite image GFr1+2. However, the moving body regions A2B and A3B represent substantially the same image. Thus, the image in the moving body region A2B will not be substantially changed in the composite image GFr1+2.

At last, a fourth composite image GFr1+2+3+4, in other words, a final composite image G0 is obtained by overwriting the moving body region A4A, which is cut out from the frame Fr4, on the third composite image GFr1+2+3. Note that the moving body region A4A corresponds to the region of the moving body X0 in the frame Fr4. Accordingly, the moving body region A4A is overwritten on the region corresponding to the moving body region A3B and a fragment of the circle of the moving body region A3A in the composite image GFr1+2+3. Thus, the movement trajectory of the moving body X0 appears on the composite image G0.

As described above, the mask regions of the mask frames M1 to M3, which are calculated in the first embodiment, represent the regions of the moving body X0 included in the frames Fr1 to Fr3. The reference mask frame Frc1 represents the region of the moving body X0 included in the reference frame Fr4. As a result, the mask frames M1 to M3 and the reference mask frame Frc1 are used to mask the frames Fr1 to Fr3 and the reference frame Fr4, respectively. This makes it possible to cut out the moving body regions A1 to A4 from the frames Fr1 to Fr4 appropriately even when the moving image data D0 includes both backgrounds and the moving body X0. Therefore, the composite image including the movement trajectory of the moving body X0 can be easily obtained by using the cutout moving body regions A1 to A4.

The first mask frame calculating means 2, the second mask frame calculating means 3, and the region cutout means 4 perform relatively simple processes. The first mask frame calculating means 2 calculates and binarizes the absolute values of the difference values. The second mask frame calculating means 3 performs accumulation and binarization. The region cutout means 4 performs masking. Therefore, it is possible to cut out the moving body regions A1 to A4 easily from the frames Fr1 to Fr4.

Figure 8:
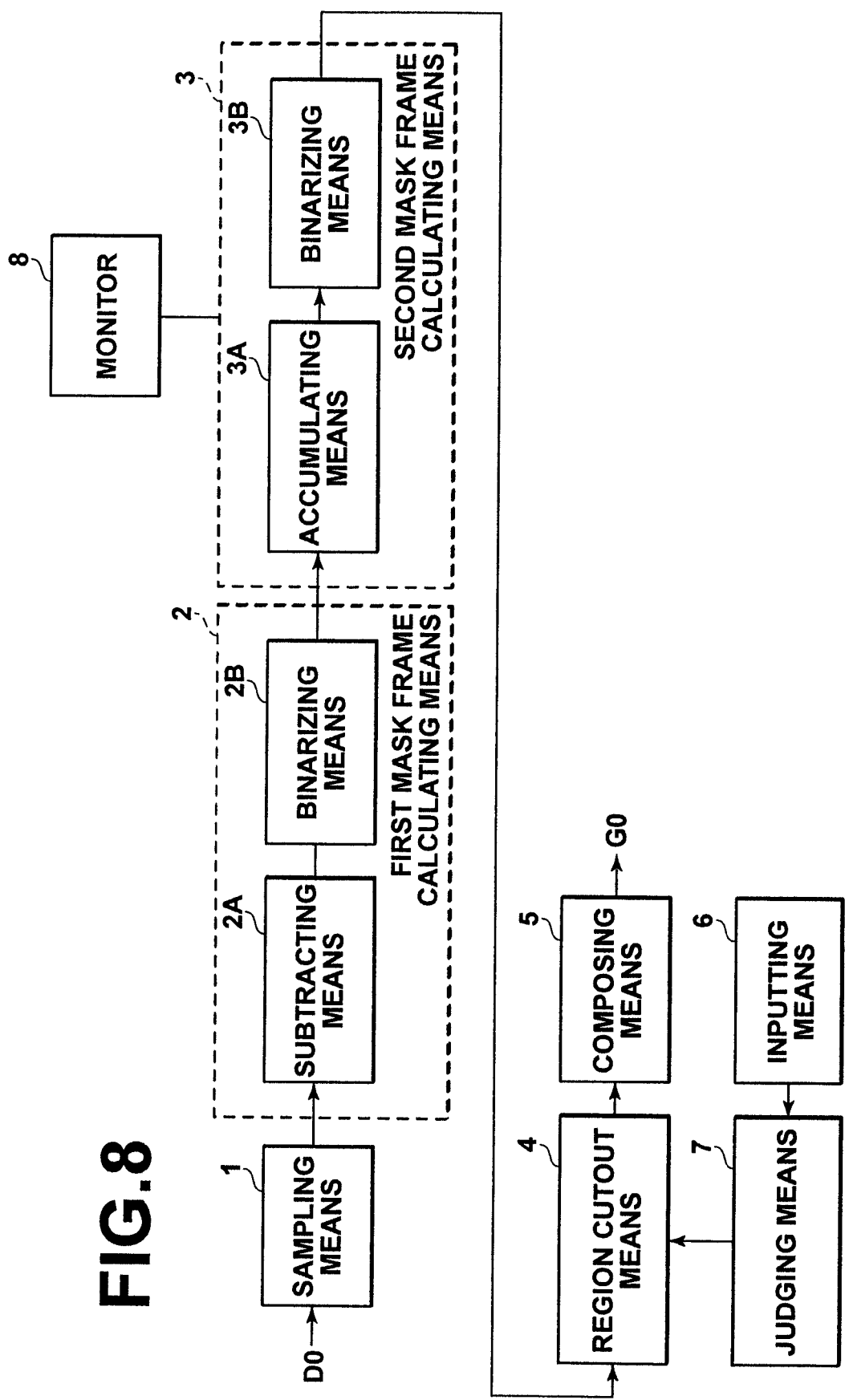
FIG. 8 is a schematic block diagram showing the configuration of a system for composing a moving image according to a second embodiment of the present invention, which includes a device for cutting out a moving image.

Next, a second embodiment of the present invention is described. FIG. 8 is a schematic block diagram showing the configuration of a system for composing a moving image according to a second embodiment of the present invention, which includes a device for cutting out a moving image. Note that the components in the second embodiment, which are the same as those in the first embodiment, are given the same reference numerals, and details thereof are omitted.

The system for composing a moving image according to the second embodiment further comprises inputting means 6, judging means 7, and a monitor 8, in addition to the components in the first embodiment. The inputting means 6 accepts inputs of the first number of frames C1, the second number of frames C2, and the third number of frames C3. In the case where a plurality of frames Fr1 to Fr4 are overlapped, the first number of frames C1 indicates the number of other frames having regions which correspond to a moving body X0 and do not overlap with a region corresponding to the moving body X0 in a reference frame Fr4. The second number of frames C2 indicates the number of other frames having regions which correspond to the moving body X0 and overlap with the region corresponding to the moving body X0 in the reference frame Fr4. The third number of frames C3 indicates the number of other frames having regions which correspond to the moving body X0 and overlap with each other. The judging means 7 judges whether the condition C1>C2>C3 is satisfied among the inputted first number of frames C1, second number of frames C2, and third number of frames C3. Only when the condition is satisfied, the judging means 7 allows region cutout means 4 to cut out moving body regions. The monitor 8 displays a cumulative frame Frc obtained when a reference mask frame Frc1 is obtained.

The inputting means 6 accepts the first number of frames C1, the second number of frames C2, and the third number of frames C3, which are inputted by an operator manipulating the system for composing a moving image according to the second embodiment. Those numbers are obtained by the operator monitoring a cumulative frame Frc displayed on the monitor 8. The first number of frames C1 indicates the number of other frames having regions which correspond to the moving body X0 and do not overlap with the region corresponding to the moving body X0 in the reference frame Fr4. The second number of frames C2 indicates the number of other frames having regions which correspond to the moving body X0 and overlap with the region corresponding to the moving body X0 in the reference frame Fr4. The third number of frames C3 indicates the number of other frames having regions which correspond to the moving body X0 and overlap with each other. Note that the monitor 8 may display not only the cumulative frame Frc, but also an image obtained by overlapping the frames Fr1 to Fr4.

Herein, in the first embodiment, a composite image G0 is obtained from four frames Fr1 to Fr4. The first number of frames C1 indicating the number of other frames having regions, which correspond to the moving body X0 and do not overlap with the region corresponding to the moving body X0 in the reference frame Fr4, is 2. The second number of frames C2 indicating the number of other frames having regions, which correspond to the moving body X0 and overlap with the region corresponding to the moving body X0 in the reference frame Fr4, is 1. The third number of frames C3 indicating the number of other frames having regions, which correspond to the moving body X0 and overlap with each other, is 0. Hence, the condition C1>C2>C3 is 2>1>0, and thus satisfied. Therefore, in the second embodiment, when the operator inputs C1=2, C2=1, and C3=0 from the inputting means 6, the judging means 7 judges that the condition C1>C2>C3 is satisfied and allows the region cutout means 4 to cut out the moving body regions.

Figure 9:
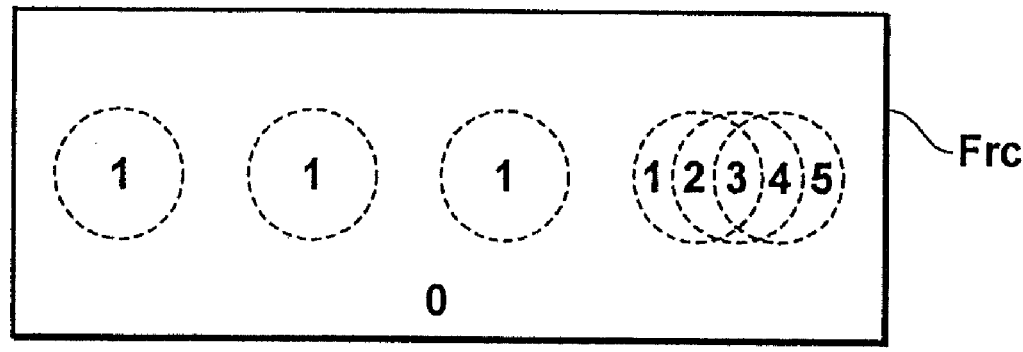
FIG. 9 is a diagram showing an example of a cumulative frame obtained from six frames.

Meanwhile, FIG. 9 shows an example of a cumulative frame Frc obtained from six frames Fr1 to Fr6. In the cumulative frame Frc shown in FIG. 9, a reference frame is the frame Fr6, which is most recent in chronological order, and the moving body X0 moves from the left to right in the drawing. Numbers in the cumulative frame Frc indicate cumulative values. In the example shown in FIG. 9, the first number of frames C1 is 3. The second number of frames C2 is 2. The third number of frames C3 is 1. Accordingly, the condition C1>C2>C3 is satisfied. Thus, when the operator inputs the values of C1=3, C2=2, C3=1 from the inputting means 6, the judging means 7 judges that the condition C1>C2>C3 is satisfied and allows the region cutout means 4 to cut out the moving body regions.

Figure 10A:
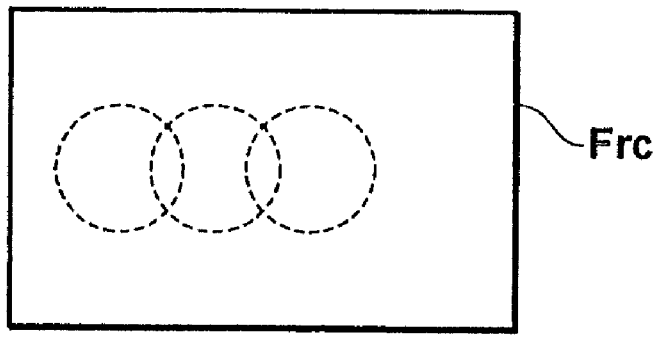
FIG. 10A is a diagram showing an example of a cumulative frame obtained from three frames.
Figure 10B:
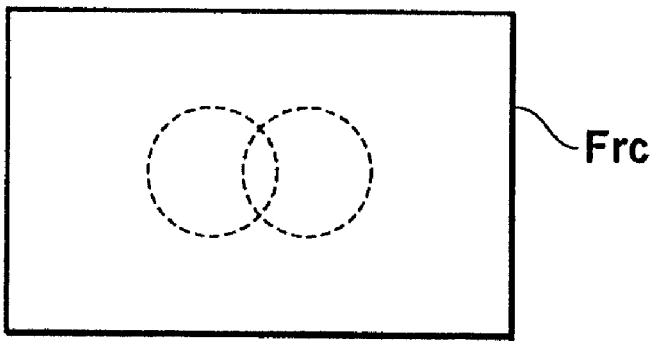
FIG. 10B is a diagram showing an example of a cumulative frame obtained from two frames.

FIG. 10A shows an example of a cumulative frame Frc obtained from three frames Fr1 to Fr3. FIG. 10B shows an example of a cumulative frame Frc obtained from two frames Fr1 and Fr2. In the cumulative frames Frc shown in FIGS. 10A and 10B, the reference frames are Fr3 and Fr2, which are most recent in chronological order, and the moving body X0 is moving from the left to right in the drawing.

In the example shown in FIG. 10A, the first number of frames C1 is 1. The second number of frames C2 is 1. The third number of frames C3 is 1. Accordingly, the condition C1>C2>C3 is not satisfied. Thus, when the operator inputs the values of C1=1, C2=1, and C3=1 from the inputting means 6, the judging means 7 judges that the condition C1>C2>C3 is not satisfied and does not allow the region cutout means 4 to cut out the moving body regions. In the example shown in FIG. 10B, the first number of frames C1 is 0. The second number of frames C2 is 1. The third number of frames is 0. Accordingly, the condition C1>C2>C3 is not satisfied. Thus, when the operator inputs the values of C1=0, C2=1, and C3=0 from the inputting means 6, the judging means 7 judges that the condition C1>C2>C3 is not satisfied and does not allow the region cutout means 4 to cut out the moving body regions.

As described above, in the second embodiment, the inputting means 6 accepts the inputs of the first to third numbers of frames C1 to C3, and the judging means 7 judges whether the condition C1>C2>C3 is satisfied. Only when the condition C1>C2>C3 is satisfied, the judging means 7 allows the region cutout means 4 to cut out the moving body regions. Therefore, it is possible to ensure that the moving body region corresponding to the moving body X0 is cut out from each frame.

Figure 11:
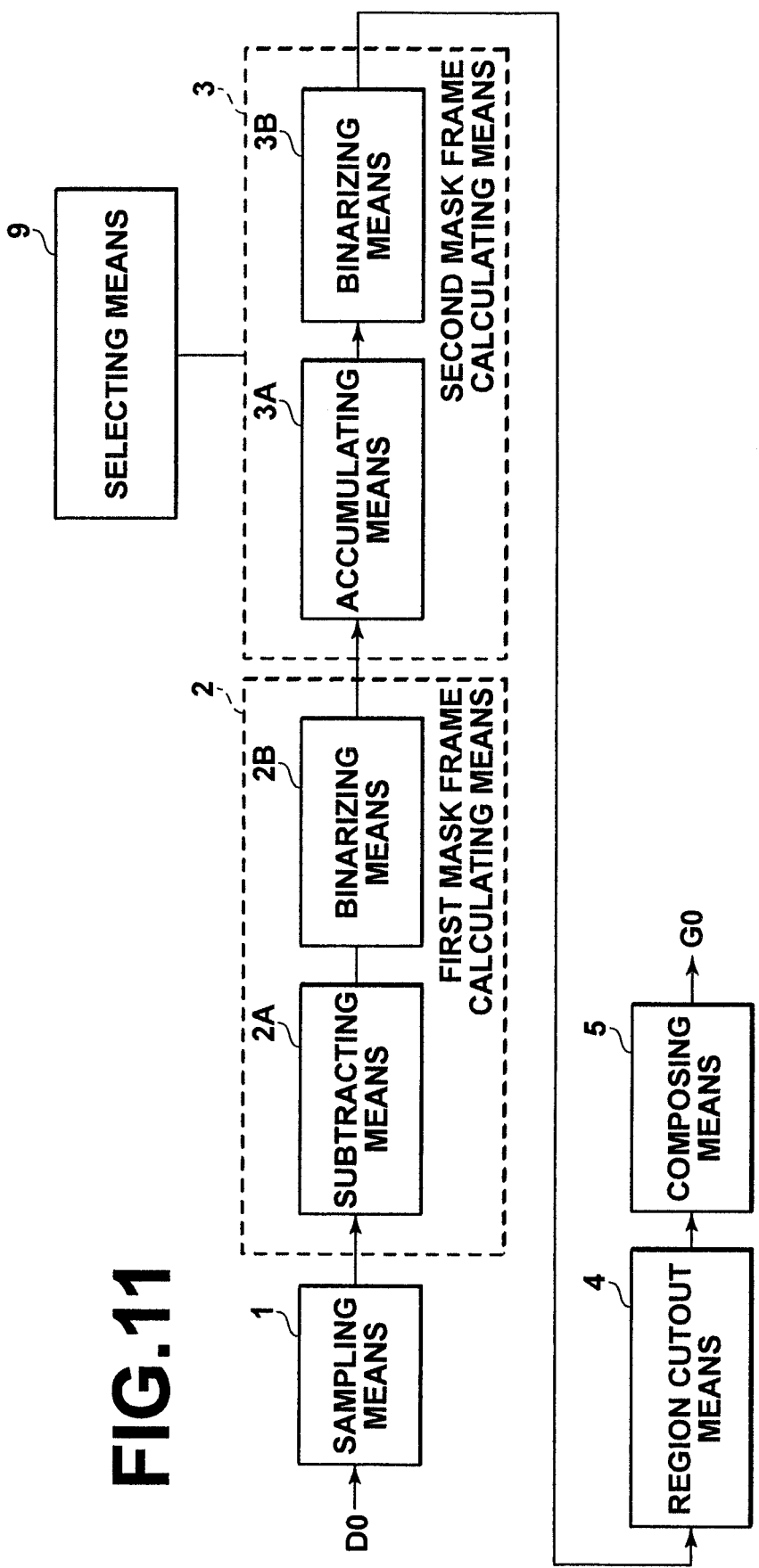
FIG. 11 is a schematic block diagram showing the configuration of a system for composing a moving image according to a third embodiment of the present invention, which includes a device for cutting out a moving image.

Next, a third embodiment of the present invention is described. FIG. 11 is a schematic block diagram showing the configuration of a system for composing a moving image according to the third embodiment of the present invention. Note that the components in the third embodiment, which are the same as those in the first embodiment, are given the same reference numerals, and details thereof are omitted.

The system for composing a moving image according to the third embodiment further comprises selecting means 9, in addition to the components in the system for composing a moving image according to the first embodiment. The selecting means 9 compares the sizes of mask regions in each of mask frames with a third threshold Th3 and selects a mask frame, of which the size of the mask region exceeds the third threshold Th3. Second mask frame calculating means 3 employs only the mask frame selected by the selecting means 9 to calculate a reference mask frame Frc1.

Figure 14A:
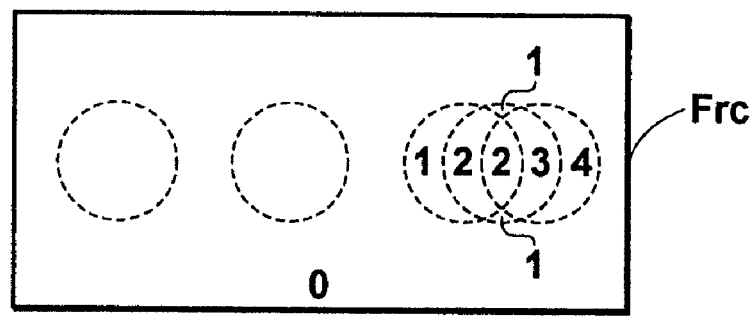
FIG. 14A is a diagram showing a cumulative frame.
Figure 14B:
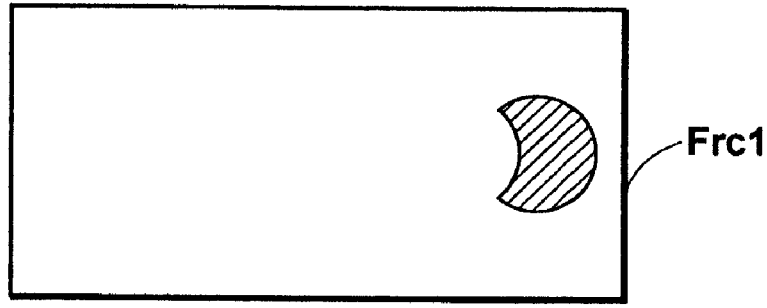
FIG. 14B is a diagram showing a reference mask frame.

Herein, assume a case in which a composite image G0 is obtained by using five frames Fr1 to Fr5 shown in FIG. 12. When the frame Fr5 is set to be the reference frame, mask frames M1 to M4 corresponding to the frames Fr1 to Fr4 are as shown in FIG. 13. Meanwhile, a cumulative frame Frc is as shown in FIG. 14A. The reference mask frame Frc1, which is obtained by binarizing the cumulative frame Frc based on the threshold Th2 (Th2 is 2), is as shown in FIG. 14B.

Figure 15:
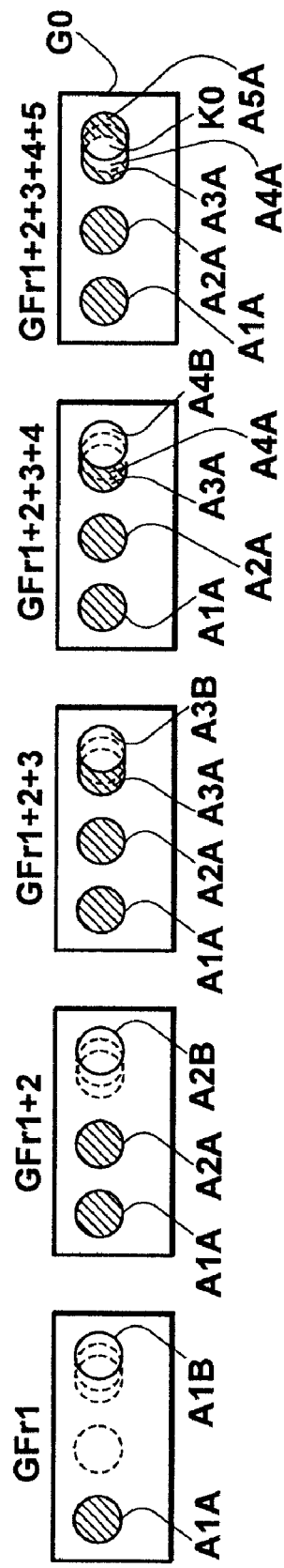
FIG. 15 is a diagram for explaining the calculation of a composite image.

The calculation of the composite image G0 based on these obtained mask frames M1 to M4 and the reference mask frame Frc1 is described with reference to FIG. 15. A first composite image GFr1 is obtained by overwriting moving body regions A1A and A1B, which are cut out from the frame Fr1, on the frame Fr1. Note that the moving body region A1A corresponds to a region of a moving body X0 in the frame Fr1, and the moving body region A1B corresponds to a region of the moving body X0 in the frame Fr5.

Next, a second composite image GFr1+2 is obtained by overwriting moving body regions A2A and A2B, which are cut out from the frame Fr2, on the first composite image GFr1. Note that the moving body region A2A corresponds to a region of the moving body X0 in the frame Fr2, and the moving body region A2B corresponds to the region of the moving body X0 in the frame Fr5. Consequently, the moving body region A2B is overwritten on the moving body region A1B in the composite image GFr1.

Subsequently, a third composite image GFr1+2+3 is obtained by overwriting moving body regions A3A and A3B, which are cut out from the frame Fr3, on the second composite image GFr1+2. Note that the moving body region A3A corresponds to a region of the moving body X0 in the frame Fr3, and the moving body region A3B corresponds to the region of the moving body X0 in the frame Fr5. Accordingly, the moving body region A3B is overwritten on the moving body region A2B partially in the composite image GFr1+2.

Moreover, a fourth composite image GFr1+2+3+4 is obtained by overwriting moving body regions A4A and A4B, which are cut out from the frame Fr4, on the third composite image GFr1+2+3. Note that the moving body region A4A corresponds to part of a region of the moving body X0 in the frame Fr4, and the moving body region A4B corresponds to part of a region of the moving body X0 in the frame Fr5. Accordingly, the moving body region A4B is overwritten on the moving body region A3B in the composite image GFr1+2+3.

At last, a fifth composite image GFr1+2+3+4+5, in other words, a final composite image G0 is obtained by overwriting a moving body region A5A, which is cut out from the frame Fr5, on the fourth composite image GFr1+2+3+4.

Herein, part of the circular moving body X0 is missing in the reference mask frame Frc1. Thus, a region K0 without the moving body X0 appears in a portion in the obtained composite image G0, where the moving body regions A3A, A4A, and A5A are overlapped.

As a result, in the third embodiment, the selecting means 9 compares the sizes of the mask regions in the mask frames M1 to M4 with the threshold Th3. Thereafter, the selecting means 9 removes the mask frames, of which size of the mask region is the threshold Th3 or less, from the calculation of the reference mask frame Frc1. Accordingly, the selecting means 9 selects only the mask frames, of which size of the mask region exceeds the threshold Th3, for the calculation of the reference mask frame Frc1.

Herein, the mask region of the mask frame M4 is the smallest among the mask regions of the mask frames M1 to M4 shown in FIG. 13, in terms of size. Hence, by setting the threshold Th3 to an appropriate value (e.g., a half of the maximum value of an area among the individual mask regions in the mask frames M1 to M4), the selecting means 9 selects the mask frames M1 to M3 for the calculation of the reference mask frame Frc1.

Figure 16A:
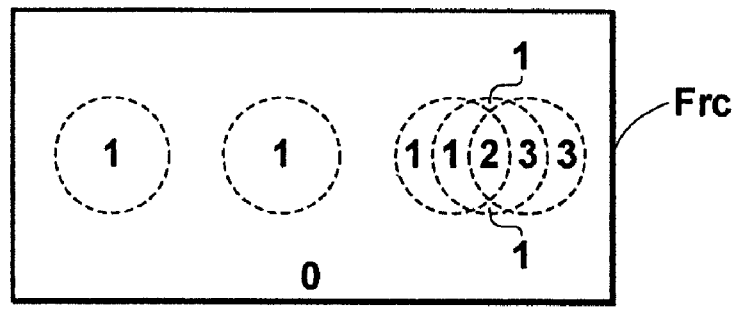
FIG. 16A is a diagram showing a cumulative frame.
Figure 16B:
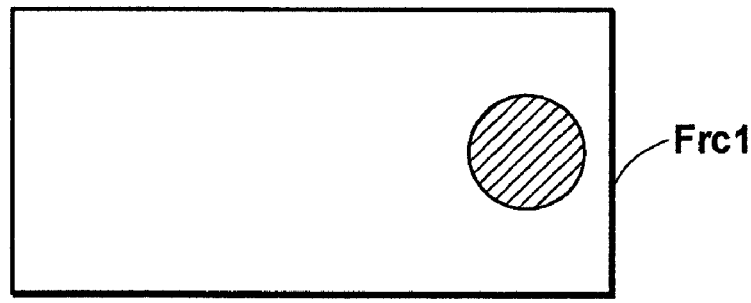
FIG. 16B is a diagram showing a reference mask frame.

The second mask frame calculating means 3 calculates the cumulative frame Frc by accumulating the selected mask frames M1 to M3. FIG. 16A shows the cumulative frame Frc obtained from the mask frames M1 to M3. FIG. 16B shows the reference mask frame Frc1 obtained by binarizing the cumulative frame Frc shown in FIG. 16A based on the threshold Th2 (Th2 is 1).

Figure 17:
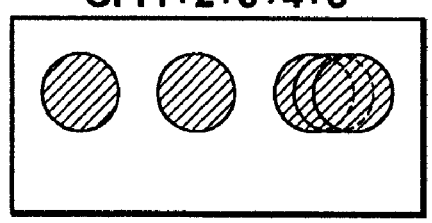
FIG. 17 is a diagram for explaining the calculation of a composite image.

When the moving body region A5A is cut out from the frame Fr5 based on the calculated reference mask frame Frc1, it is possible to cut out the moving body region A5A without missing part of the moving body X0 included in the frame Fr5. Accordingly, the fifth composite image GFr1+2+3+4+5, that is, the final composite image G0, which is obtained by overwriting the moving body region A5A cut out from the frame Fr5 on the fourth composite image GFr1+2+3+4, has a complete moving body X0 in the final frame Fr5 as shown in FIG. 17. Therefore, it is possible to obtain the composite image G0 including the movement trajectory of the moving body X0 without missing part of the moving body X0.

Note that the system for composing a moving image in the third embodiment may further comprise inputting means 6, judging means 7, and a monitor 8 as in the second embodiment. Accordingly, the system may accept the inputs of the first number of frames C1, the second number of frames C2, and the third number of frames C3 and cut out the moving body regions from the frames by the region cutout means 4 only when the condition C1>C2>C3 is satisfied.

Figure 18:
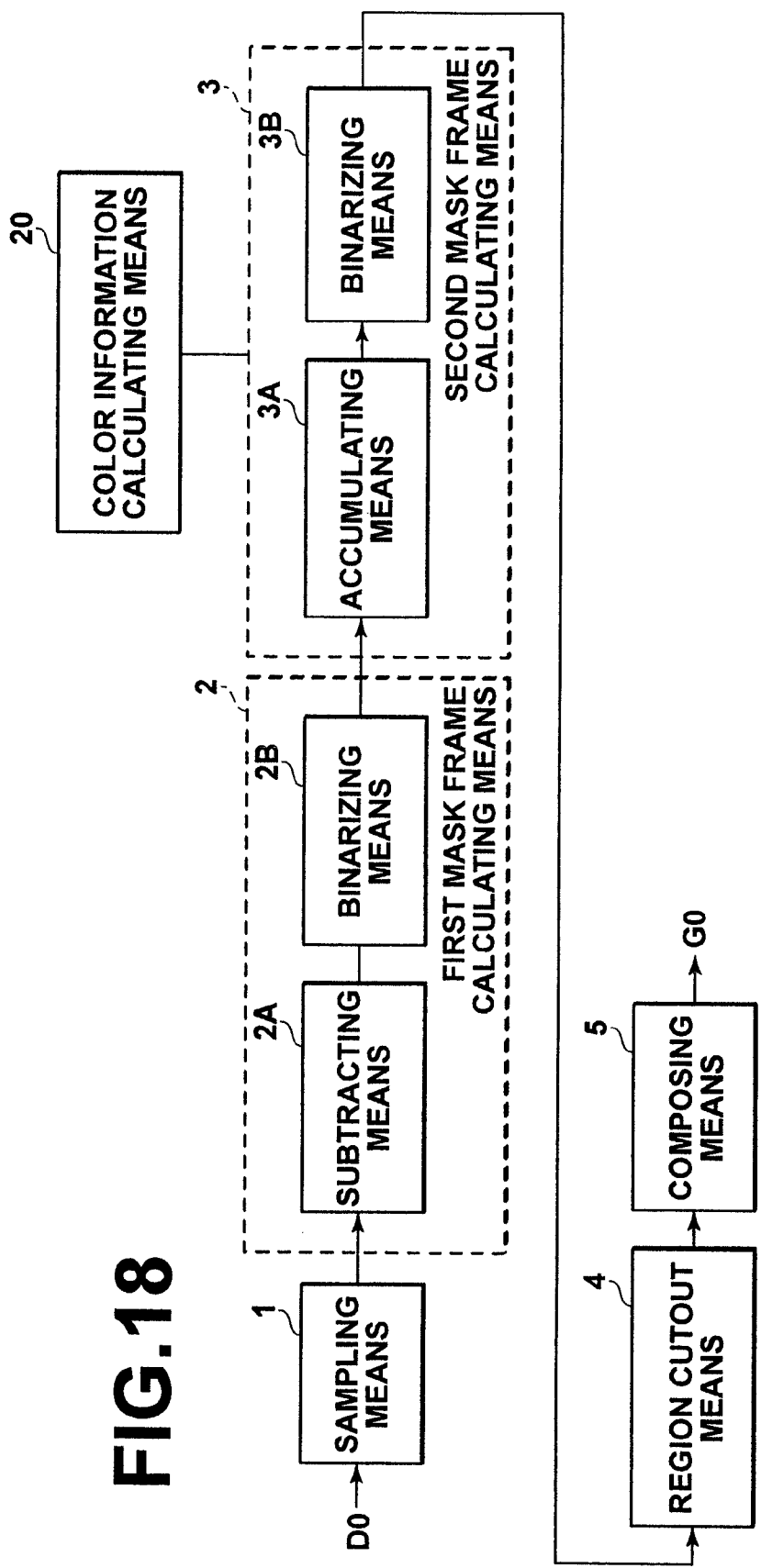
FIG. 18 is a schematic block diagram showing the configuration of a system for composing a moving image according to a fourth embodiment of the present invention, which includes a device for cutting out a moving image.

Next, a fourth embodiment of the present invention is described. FIG. 18 is a schematic block diagram showing the configuration of a system for composing a moving image according to a fourth embodiment of the present invention, which includes a device for cutting out a moving image. Note that the components in the fourth embodiment, which are the same as those in the first embodiment, are given the same reference numerals, and details thereof are omitted.

The system for composing a moving image according to the fourth embodiment further comprises color information calculating means 20, in addition to the components in the system for composing a moving image according to the first embodiment. The color information calculating means 20 calculates color information on a region on a reference frame, which corresponds to a mask region of a reference mask frame Frc1. The color information calculating means then weights a region on a cumulative frame Frc, which corresponds to a region having color information similar to the calculated color information. The weighted cumulative frame Frc is binarized based on a threshold Th2 to re-calculate the reference mask frame Frc1.

Herein, assume a case in which a composite image G0 is obtained by using five frames Fr1 to Fr5 as shown in FIG. 12, similar to the third embodiment. When the frame Fr5 is set to be the reference frame, mask frames M1 to M4 corresponding to the frames Fr1 to Fr4 are as shown in FIG. 13. Meanwhile, a cumulative frame Frc is as shown in FIG. 14A. The reference mask frame Frc1, which is obtained by binarizing the cumulative frame Frc based on the threshold Th2 (Th2 is 2), is as shown in FIG. 14B.

Consequently, part of the circular moving body X0 is missing in the reference mask frame Frc1. Thus, as previously mentioned, the region K0 without the moving body X0 appears in a portion, where the moving body regions A3A, A4A, and A5A are overlapped, in the composite image G0 obtained by using the reference mask frame Frc1.

Therefore, with the premise that the moving body X0 has substantially the same color, the color information calculating means 20 in the fourth embodiment cuts out the moving body region A5A from the reference frame Fr5 by using the previously calculated reference mask frame Frc1, calculates the color information on the moving body region A5A, and re-calculates the reference mask frame Frc1 by using the color information.

Specifically, the color information calculating means 20 obtains a histogram of the cutout moving body region A5A and calculates a color represented by a median value of the histogram as the color information on the moving body region A5A. Note that color data RGB or luminance and chrominance data YCC form the moving image data D0 and the frames Fr1 to Fr5. Accordingly, the median value of the histogram is calculated using each component of RGB or the chrominance components of YCC. A color formed of the median value of each component is calculated as the color information. Note that a color having a mean value of the histogram or a frequency more than or equal to a predetermined value in the histogram may be calculated, instead of having the median value of the histogram.

Figure 19:
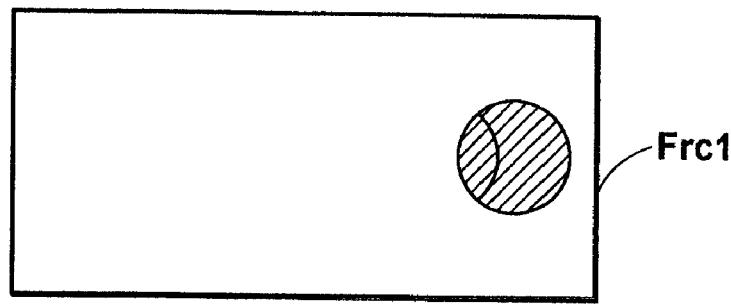
FIG. 19 is a diagram showing a color region obtained in the fourth embodiment.

Next, the color information calculating means 20 obtains a color region having a color similar to that represented by the calculated color information on the reference frame Fr5. Specifically, a region, which has a color within a predetermined color space range with a center of the color information calculated in the color space, is obtained as the color region. Herein, part of the circular moving body X0 is missing on the moving body region A5A shown in FIG. 14B, which is cut out from the reference frame Fr5 by using the reference mask frame Frc1. However, since the color information on the moving body region A5A represents a color of the moving body X0, the color region obtained by the calculated color information corresponds to the circular object X0 as shown in FIG. 19.

Figure 20A:
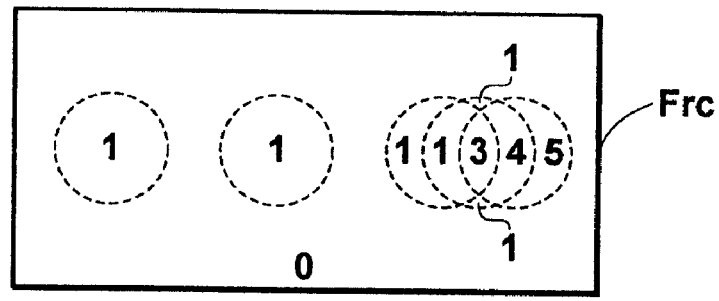
FIG. 20A is a diagram showing a cumulative frame.
Figure 20B:
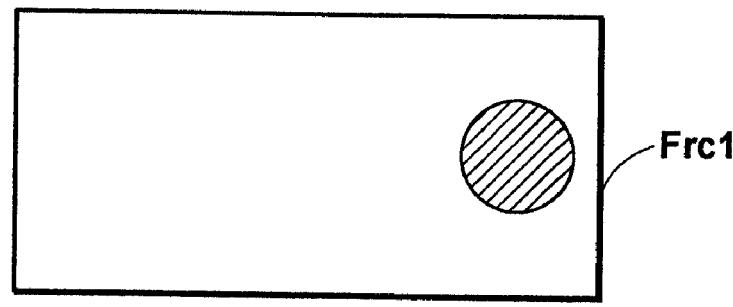
FIG. 20B is a diagram showing a reference mask frame.

Subsequently, the color information calculating means 20 weights the cumulative frame Frc by adding the cumulative value to the region corresponding to the color region on the cumulative frame Frc. Note that the cumulative value of 1 is added herein. FIG. 20A shows the cumulative frame Frc to which the cumulative value is added. FIG. 20B shows the reference mask frame Frc1 obtained by binarizing the cumulative frame Frc shown in FIG. 20A with a threshold Th2 (Th2 is 2).

When the moving body region A5A is cut out from the frame Fr5 by using the re-calculated reference mask frame Frc1, it is possible to cut out the moving body region A5A without missing part of the moving body X0 included in the frame Fr5. Accordingly, the fifth composite image GFr1+2+ 3+4+5, that is, the final composite image G0, which is obtained by overwriting the moving body region A5A cut out from the frame Fr5 on the fourth composite image GFr1+2+ 3+4, has a complete moving body X0 in the final frame Fr5 as shown in FIG. 17. Therefore, it is possible to obtain the composite image G0 including the movement trajectory of the moving body X0 without missing part of the moving body X0.

Note that the system for composing a moving image in the fourth embodiment may further comprise inputting means 6, judging means 7, and a monitor 8 as in the second embodiment. Accordingly, the system may accept the inputs of the first number of frames C1, the second number of frames C2, and the third number of frames C3 and cut out the moving body regions from the frames by the region cutout means 4 only when the condition C1>C2>C3 is satisfied.

Next, a fifth embodiment of the present invention is described. FIG. 21 is a schematic block diagram showing the configuration of a system for composing a moving image according to a fifth embodiment of the present invention, which includes a device for cutting out a moving image. Note that the components in the fifth embodiment, which are the same as those in the first embodiment, are given the same reference numerals, and details thereof are omitted.

The system for composing a moving image according to the fifth embodiment further comprises aligning means 10 and frame correcting means 11, in addition to the components in the system for composing a moving image according to the first embodiment. Furthermore, first mask frame calculating means 2 further comprises filtering means 2C. The aligning means 10 aligns a plurality of frames Fri sampled from the sampling means 1. The frame correcting means 11 corrects the pixel values of the plurality of aligned frames Fri. The filtering means 2C filters an absolute value |di (x, y)| of a difference value calculated by subtracting means 2A.

Similar to the first embodiment, four frames Fr1 to Fr4 are sampled in the description below. However, the present invention is not limited to this.

Figure 22:
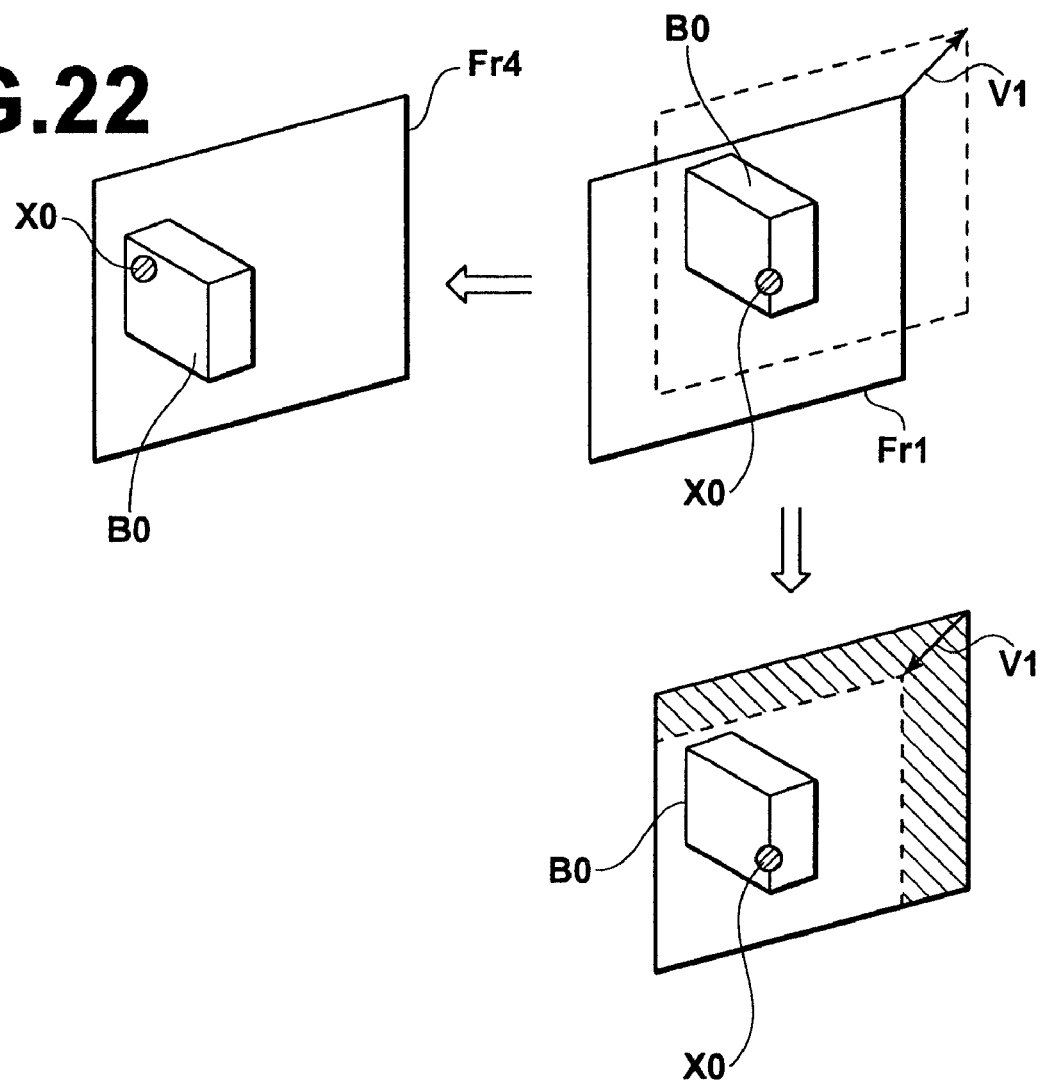
FIG. 22 is a diagram for explaining the alignment by aligning means.

The aligning means 10 aligns other frames Fr1 to Fr3 with a reference frame Fr4. FIG. 22 is a diagram for explaining the alignment by the aligning means 10. Herein, the alignment of the frames Fr1 and Fr4 is described. As shown in FIG. 22, each of the frames Fr1 and Fr4 includes a circular moving body X0 and a cuboid background B0. Upon filming, the background B0 is not supposed to be moving. However, not only the moving body X0 but also the background B0 are moved between the frames Fr1 and Fr4 in actual cases due to wobbling or the like. Nevertheless, the movement amount of the background B0 differs from that of the moving body X0. Meanwhile, the moving body X0 stays still when the movement amount of the moving body X0 agrees with that of the background B0. Note that FIG. 22 shows the movement amount of the background B0 in a larger scale to facilitate explanation.

The aligning means 10 moves the frame Fr1 parallel to the frame Fr4. Thereafter, the aligning means 10 calculates the movement amount and direction of the frame Fr4, where the correlation becomes maximum between pixel values of each pixel Fr1 (x, y) of the frame Fr1 and each pixel Fr4 (x, y) of the frame Fr4, as a motion vector V1 regarding the frame Fr1. The aligning means 10 moves the frame Fr1 parallel to the movement direction reverse to the motion vector V1, in other words, a direction of a motion vector −V1 to align the frame Fr1 with the frame Fr4. Herein, since a region of the moving body X0 is smaller than the background B0, the background B0 affects the correlation value, rather than the moving body X0. Thus, the aligning means 10 aligns only background regions between the frames Fr1 and Fr4.

Note that the aligning means 10 judges that the correlation is maximal when a cumulative sum obtained by squaring the difference of the pixel values between the frames Fr1 and Fr4 or a cumulative sum of the absolute values is minimal.

Herein, the motion vector V1 is calculated to move the frame Fr1 parallel to align the frames Fr1 and Fr4. However, the frames Fr1 and Fr4 may be aligned by using other methods such as affine transformation and the method disclosed in Japanese Patent Application No. 2002-249212. In the method disclosed in Japanese Patent Application No. 2002-249212, a reference patch including one or a plurality of rectangular region is disposed on the reference frame (i.e., frame Fr4). A patch having the same structure as the reference patch is disposed on the other frame (i.e., frame Fr1). The patch is moved and/or transformed on the frame Fr1 so that an image in the patch may match an image in the reference patch. Based on the reference patch and the moved and/or transformed patch, a correspondence is estimated between a pixel in the patch on the frame Fr1 and a pixel in the reference patch on the frame Fr4. The frames are aligned based on the correspondence.

When the frames Fr1 to Fr4 are formed of luminance and chrominance components YCC, the alignment may be performed in terms of the Y component, instead of all the components. As for the other components, the alignment is performed similarly to the Y component. When the frames Fr1 to Fr4 are formed of RGB components, the alignment may be performed for only one of the RGB components, instead of all the components. As for the other components, the alignment may be performed similarly to the component with which the alignment was performed.

By the alignment, a region where a pixel does not have a signal value (e.g., a shaded area in the aligned frame Fr1 in FIG. 22) appears in the aligned frames Fr1 to Fr3. Thus, the frame correcting means 11, first mask frame calculating means 2, and second mask frame calculating means 3, which are steps after the aligning means 10, correct the frames, calculate mask frames, and calculate a cumulative binary mask frame for only the region where the pixel has a signal value, respectively.

The frame correcting means 11 calculates a mean value of pixel values, which indicates a level of the pixel values for each of the frames Fr1 to Fr3 and the reference frame Fr4 before or after the alignment. The frame correcting means 11 corrects the pixel values of the plurality of frames Fr1 to Fr4 so that the mean values may substantially match.

Specifically, mean values FrMi to FrM4 of all the pixel values are calculated for the frames Fr1 to Fr3 (after aligned) and the reference frame Fr4 by using the following equation (4):

$$FrMi = \Sigma Fri(x, y)/(m \times n) \quad (4)$$

where m×n is the total number of pixels having pixel values in the frame Fri before or after the alignment.

As for the frames Fr1 to Fr3, the pixel values of the frames Fr1 to Fr3 are corrected by using the equation (5) below so that the mean value FrMi of all the pixel values may match the mean value FrM4 of all the pixel values of the reference frame.

$$FriH(x,y) = Fri(x,y) + (FrM4(x,y) - FrMi(x,y)) \quad (5)$$

where FriH(x,y) is a pixel value of the corrected frame, and i is 1, 2, or 3.

When the frames Fr1 to Fr4 are formed of luminance and chrominance components YCC, the frames Fr1 to Fr4 may be corrected in terms of only the Y component, instead of all the components.

Instead of a mean value, any values that represent all the pixels in the frames Fr1 to Fr3, such as a median value of all the pixels and a maximum frequency value of a histogram, may be used.

Figure 23:
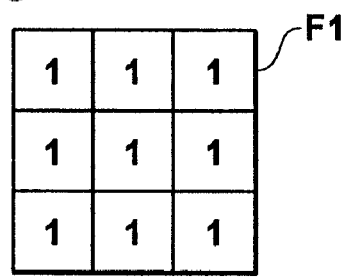
FIG. 23 is a diagram showing an example of a filter used by filtering means.

The filtering means 2C filters the absolute values of the difference values between the corresponding pixels in the reference frame Fr4 and the other frames Fr1 to Fr3 (which are aligned and of which pixel values are corrected), which are calculated by the subtracting means 2A. FIG. 23 is a diagram showing an example of a filter used by the filtering means 2C. A filter F1 shown in FIG. 23 is a low pass filter which sets a mean value of pixel values of eight adjacent pixels including self as a self pixel value.

Herein, the regions where the absolute values are relatively large correspond originally to the moving body X0 included in the reference frame Fr4 and the other frames Fr1 to Fr3. However, each of the frames Fr1 to Fr4 includes noise upon filming and noise due to the movement of the moving body X0. Accordingly, the regions where the absolute values are relatively large possibly include small regions where the absolute values are small. On the contrary, the regions where the absolute values are small possibly include small regions where the absolute values are relatively large. Consequently, the filter F1 shown in FIG. 23 filters the absolute values of the difference values, and thus it is possible to remove the noise due to the small regions from the absolute values. Therefore, the mask frames M1 to M3 can be precisely calculated while the effects of the noise are reduced.

Herein, a 3×3 low pass filter is used. However, a 5×5 or larger low pass filter may be used. Alternatively, a median filter, a maximum value filter, or a minimum value filter may be used.

Figure 24:
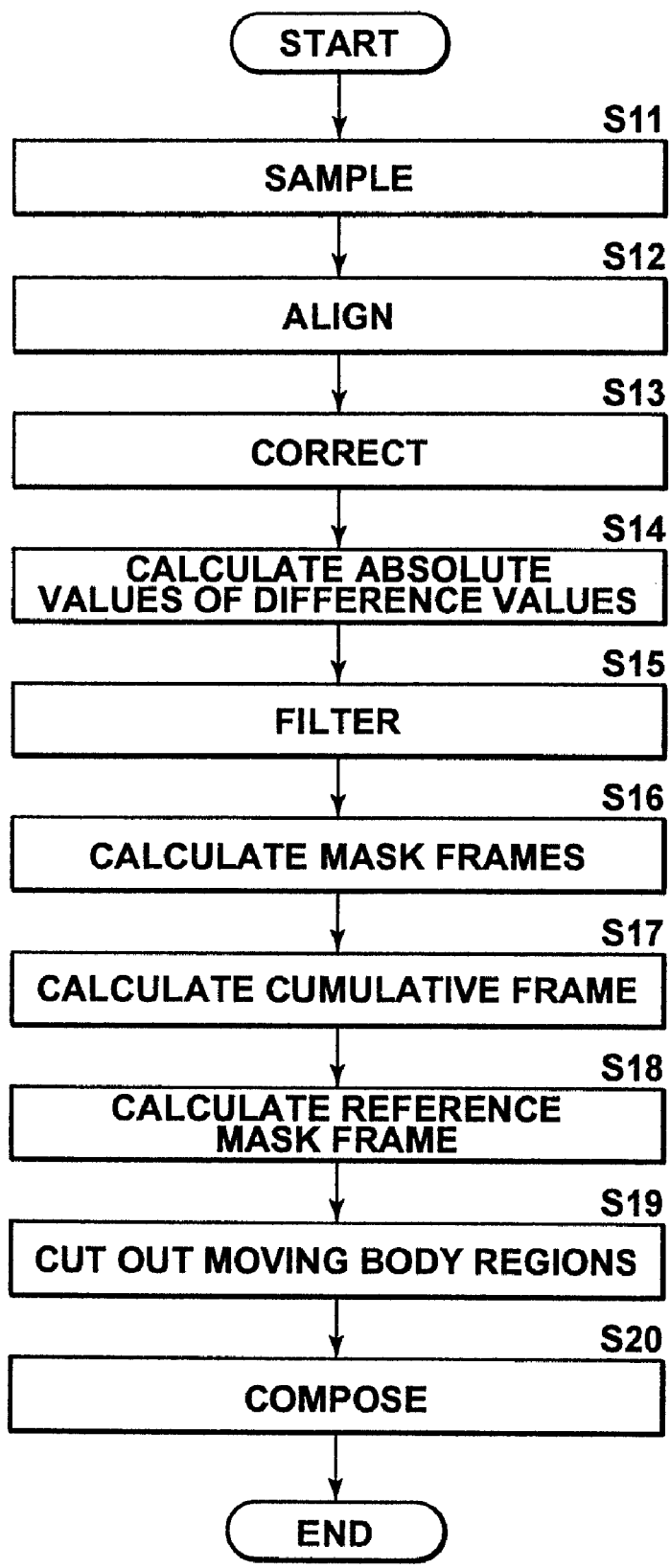
FIG. 24 is a flow chart showing the process performed in the fifth embodiment.

Next, the process performed in the fifth embodiment is described. FIG. 24 is a flow chart showing the process performed in the fifth embodiment. Herein, similar to the first embodiment, the four frames Fr1 to Fr4 are sampled in the description.

First, sampling means 1 samples the four frames Fr1 to Fr4 from moving image data D0 (Step S11). Second, the aligning means 10 aligns the frames Fr1 to Fr3 with the reference frame Fr4 (Step S12). Third, the frame correcting means 11 corrects the pixel values of the aligned (or pre-aligned) frames Fr1 to Fr4 (Step S13).

Fourth, subtracting means 2A of the first mask frame calculating means 2 calculates the absolute values |di (x, y)| of the difference values between the corresponding pixels in the reference frame Fr4 and the other frames Fr1 to Fr3, among the plurality of aligned and corrected frames Fr1 to Fr4 (Step S14). Fifth, the filtering means 2C filters the absolute values of the difference values by using the filter F1 shown in FIG. 23 (Step S15).

Sixth, binarizing means 2B binarizes the filtered absolute values of the difference values based on the threshold Th1 to calculate the mask frames M1 to M3 (Step S16).

Seventh, accumulating means 3A of second mask frame calculating means 3 accumulates the corresponding pixels for all the mask frames M1 to M3 to calculate a cumulative frame Frc (Step S17). Eighth, binarizing means 3B binarizes the cumulative frame Frc based on the threshold Th2 to calculate the reference mask frame Frc1 (Step S18).

Ninth, region cutout means 4 masks the frames Fr1 to Fr3 by using the corresponding mask frames M1 to M3. The region cutout means 4 also masks the reference frame Fr4 by using the reference mask frame Frc1. Accordingly, the region cutout means 4 cuts out moving body regions A1 to A4, which correspond to the moving body X0, from the plurality of frames Fr1 to Fr4 (Step S19).

At last, composing means 5 overwrites the moving body regions A1 to A4 in chronological order at positions in one of the frames Fr1 to Fr4 (Fr1), which correspond to the moving body regions A1 to A4 to obtain a composite image G0 of the plurality of frames Fr1 to Fr4 (Step S20). The process is completed.

As described above, in the fifth embodiment, the aligning means 10 aligns the background regions in the plurality of frames Fr1 to Fr4. Accordingly, the effects of the movement of the entire frame due to wobbling or the like upon filming can be removed from the frames Fr1 to Fr4. Therefore, it is possible to cut out the moving body regions accurately from the frames while the effects of the movement of the entire frame are reduced.

Herein, when the contrast adjusting function of a video camera used for filming the moving image does not operate normally or when it becomes suddenly cloudy during outdoor filming in fine weather, the entire contrast differs between the sampled frames. Thus, when the first mask frame calculating means 2 calculates the absolute values |di (x, y)| of the difference values between the corresponding values in the reference frame Fr4 and the other frames Fr1 to Fr3 by using such frames, the absolute values |di (x, y)| will have relatively large values even in the background regions which do not correspond to the moving body X0. As a result, it is impossible to accurately calculate the mask frames M1 to M3 having the mask regions which correspond to only the moving body X0.

Thus, the frame correcting means 11 corrects the pixel values of the frames Fr1 to Fr4, and the entire contrast in each frame can be substantially the same. Hence, the background regions, which do not correspond to the moving body X, will not have extremely large absolute values |di (x, y)|. As a consequence, it is possible to accurately calculate the mask frames M1 to M3 having mask regions which correspond to only the moving body X0.

The filtering means 2C of the first mask frame calculating means 2 filters the absolute values |di (x,y)| of the difference values to remove the noise. Thus, it is possible to remove the noise from the absolute values |di (x, y)|. Therefore, the mask frames M1 to M3 can be precisely calculated while the effects of the noise are reduced.

Figure 25:
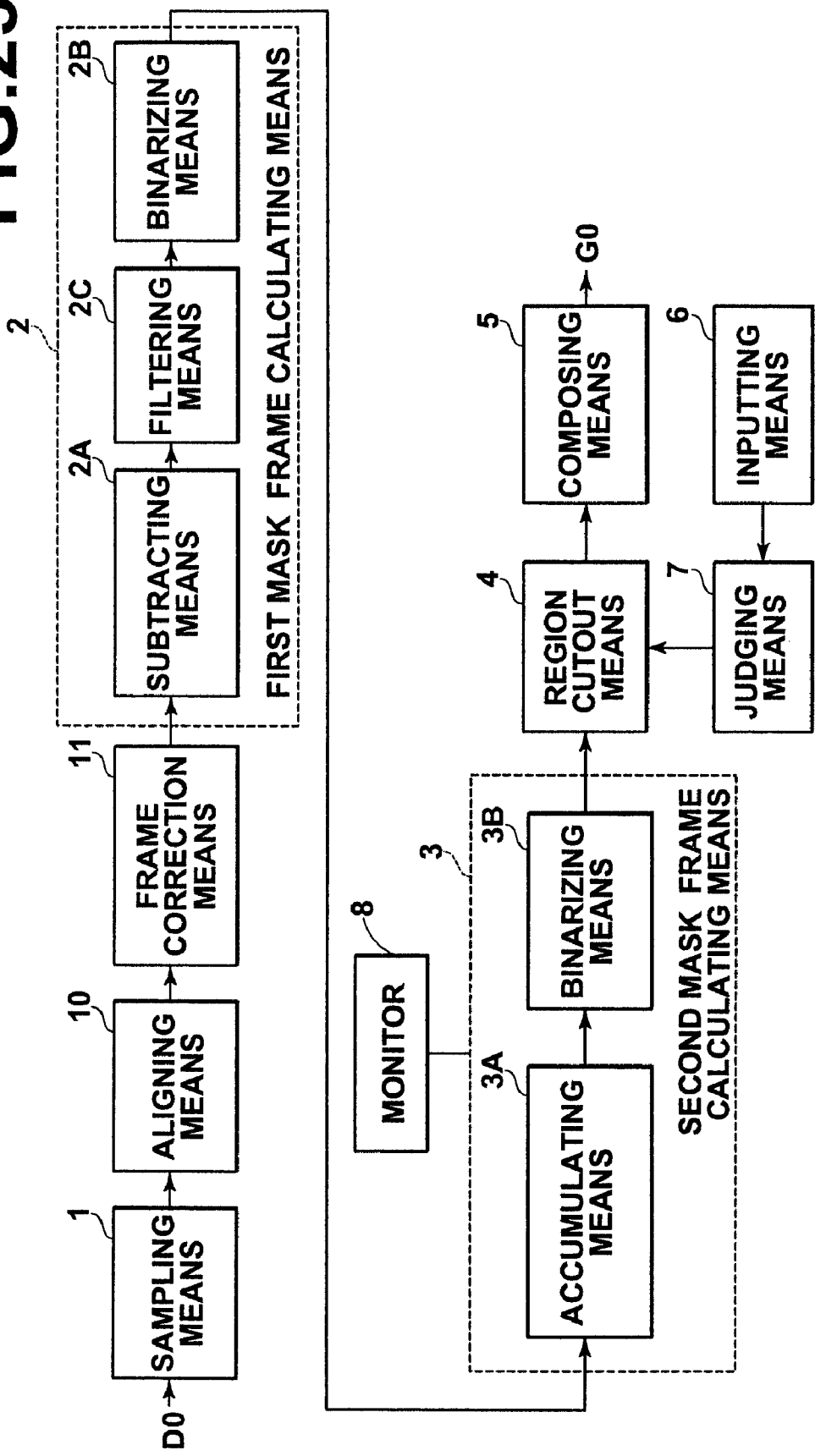
FIG. 25 is a schematic block diagram showing the configuration of a system for composing a moving image according to a sixth embodiment of the present invention, which includes a device for cutting out a moving image.

Note that, in the fifth embodiment, the system may further comprise inputting means 6, judging means 7, and a monitor 8 as a sixth embodiment shown in FIG. 25.

Figure 26:
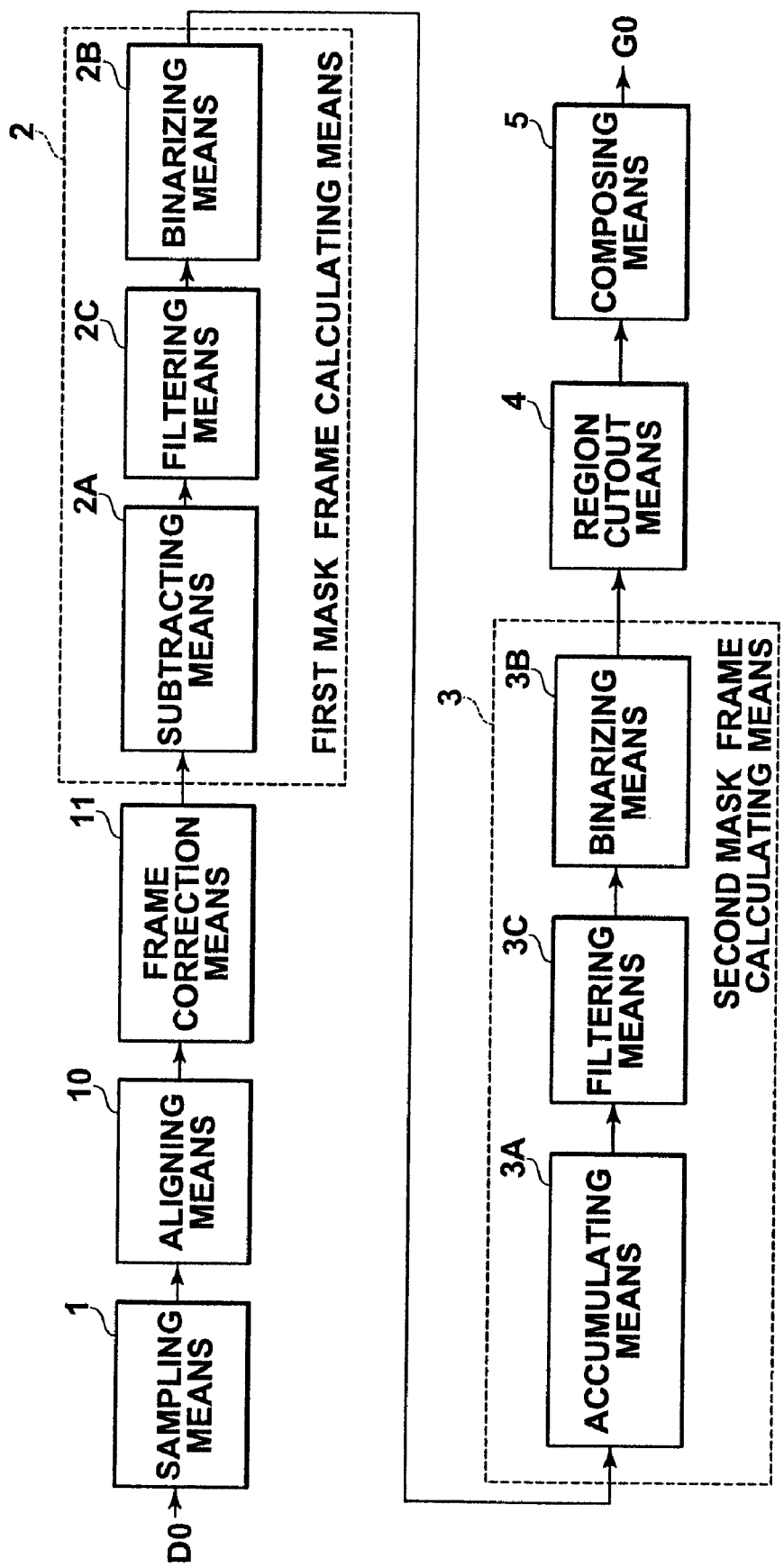
FIG. 26 is a schematic block diagram showing the configuration of a system for composing a moving image according to a seventh embodiment of the present invention, which includes a device for cutting out a moving image.

In addition, in the fifth embodiment, filtering means 3C may be provided in the second mask frame calculating means 3 as a seventh embodiment shown in FIG. 26. The filtering means 3C filters the cumulative frame Frc, which is calculated by the accumulating means 3A, by using the filter μl shown in FIG. 23.

Consequently, it is possible to remove noise upon filming and noise due to the movement of the moving body X0 from the cumulative frame Frc. Therefore, the reference mask frame Frc1 can be precisely calculated while the effects of the noise are reduced.

Furthermore, the aligning means 10 calculates the motion vector V1 between the frames to align the frames in the fifth embodiment. However, the motion vector may be calculated in terms of only the background B0 by separating the moving body X0 and the background B0 included in the frames. Hereinafter, a process in the aligning means 10 for performing the alignment by separating the moving body X0 and the background B0 in the frames is described as an eighth embodiment. Note that the alignment between the frames Fr1 and Fr4 as shown in FIG. 22 is described herein.

First, the aligning means 10 obtains a difference frame Fr5 by calculating absolute values of difference values in the corresponding pixels between the frames Fr1 and Fr4. The calculation of the absolute values of the difference values is performed using the aforementioned equation (1).

Figure 27A:
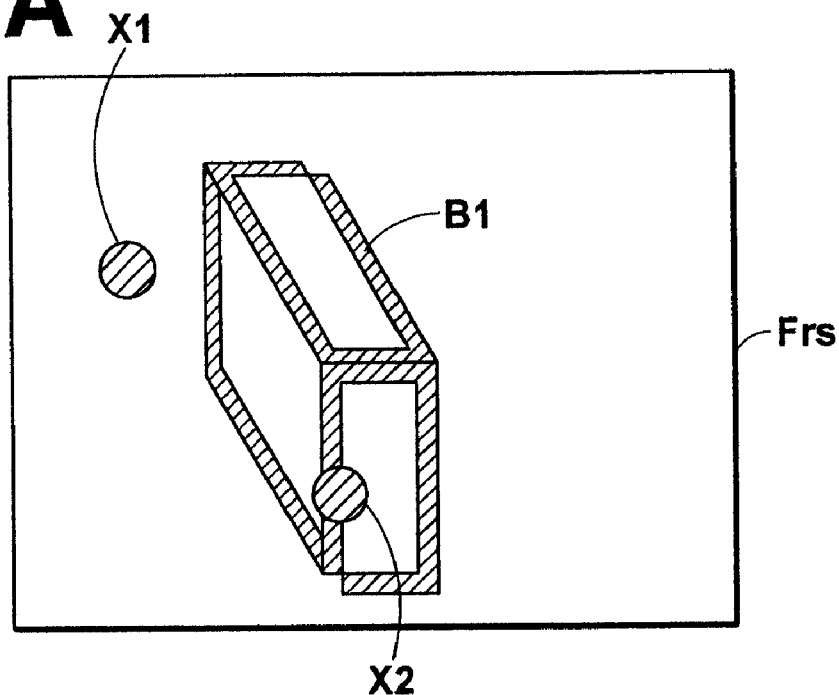
FIG. 27A is a diagram showing a difference frame.

FIG. 27A is a diagram showing the difference frame Frs. As indicated by shaded areas in FIG. 27A, moved portions between the frames Fr1 and Fr4 have large values in the difference frame Frs. Specifically, portions indicating the movement amounts of a region corresponding to the moving body X and a region corresponding to the cuboid background B0 have large values.

Second, the aligning means 10 performs morphology on the difference frame Frs. Hereinafter, the morphology is described.

The morphology has been studied as a technique effective for detecting microcalcification, which is a pathognomonic form of breast cancer in particular. The object image is not limited to the microcalcification in the mammogram. The morphology can be applied to any images in which the size or the shape of a particular image portion (abnormality, noise, or the like) is predefined to some extent (e.g., U.S. Pat. Nos. 6,233,362 and 5,937,111 and Japanese Unexamined patent Publication No. 9 (1997)-91421). The morphology is simply described below with an example of a grayscale image.

The morphology is a process to manipulate an object image by employing a morphology element. The morphology element is relative to an origin having a predetermined offset value and has a predetermined size. The morphology includes dilation, erosion, opening, and closing.

The dilation is a process to find the maximum value in a range of a center pixel±m (which is a value determined in accordance with the morphology element and corresponds to the size of the morphology element). The dilation expands bright regions and contracts dark regions in the image.

The erosion is a process to find the minimum value in a range of a center pixel±m. The erosion contracts the bright regions and expands the dark region in the image.

The opening is a process to perform the dilation after the erosion, in other words, to find the maximum value after searching the minimum value. The opening removes redundant bright fine portions, fine lines, and infinitesimal regions from the image.

The closing is a process to perform the erosion after the dilation, in other words, to find the minimum value after searching the maximum value. The closing removes redundant dark fine portions, fine lines, and infinitesimal regions from the image.

Figure 27B:
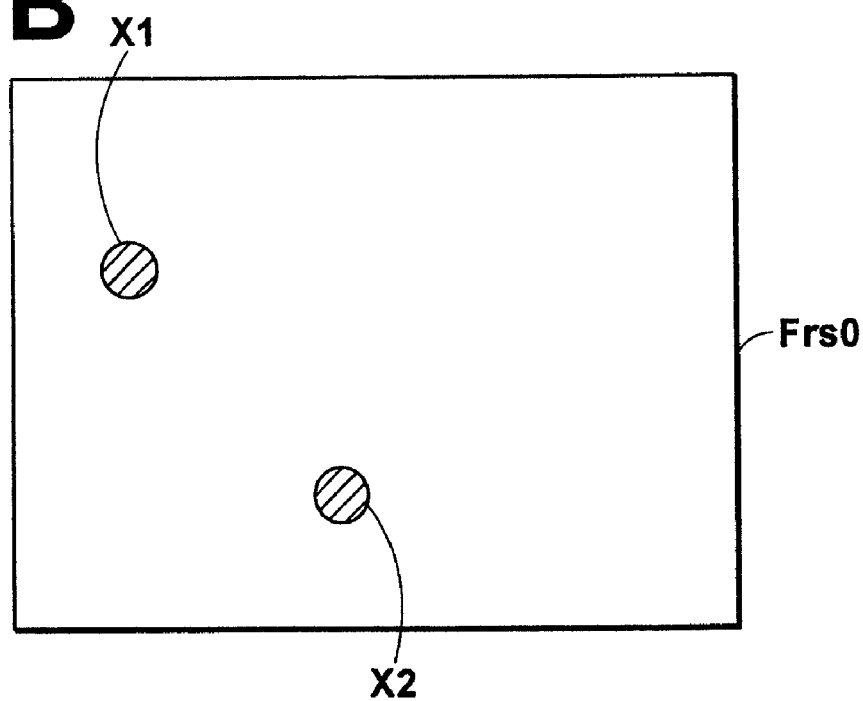
FIG. 27B is a diagram showing the difference frame after opening.

In the eighth embodiment, bright fine portions, fine lines, and infinitesimal regions are removed from the difference frame Frs by performing the opening on the difference frame Frs. Herein, the movement amount of the moving body X0 included in the frames Fr1 and Fr4 is large. Accordingly, as shown in FIG. 27A, it is possible to confirm the circular shape in the difference frame Frs. However, since the movement amount of the cuboid background B0 is small, it is impossible to confirm the shape in the difference frame Frs, and only a narrow region B1 exists along the outline of the cuboid. Thus, by performing the opening on the difference frame Frs, the narrow region B1 included in the difference frame Frs is removed from a difference frame Frs0 after the opening as shown in FIG. 27B. Therefore, only regions X1 and X2 corresponding to the moving body X0 exist.

Third, as shown in FIG. 28, the aligning means 10 removes the regions X1 and X2, which correspond to the moving body X0 in the difference frame Frs0 after the process, from the frames Fr1 and Fr4. The aligning means 10 moves the frame Fr1 parallel to the frame Fr4 after the regions X1 and X2 are removed and calculates the motion vector V1 regarding the frame Fr1 as previously mentioned. The aligning means 10 moves the frame Fr1 parallel to the motion vector—V1 and aligns the frame Fr1 with the frame Fr4.

As described above, the regions X1 and X2 corresponding to the moving body X0 are removed from the frames Fr1 and Fr4, and the frames Fr1 and Fr4 are aligned. Thus, it is possible to obtain the motion vector V1 precisely by eliminating the effects of the moving body X0 having larger movement than the background B0. Therefore, the frames Fr1 and Fr4 can be aligned precisely.

Note that the subtracting means 2A calculates the absolute values of the difference values between each frame and the reference frame to calculate the mask frames using frames except for the reference frame in the aforementioned embodiments. However, the mask frames may be calculated by calculating the absolute values of the difference values between the frames chronologically adjacent to each other. This is described as a ninth embodiment below.

FIG. 29 is a diagram for explaining the process performed in the ninth embodiment by using the frames. Similar to the first embodiment, the process using four frames Fr1 to Fr4 is described in the ninth embodiment. In the ninth embodiment, as shown in FIG. 29, mask frames Ml' to M3' are calculated by calculating and binarizing absolute values of difference values between the frames Fr1 and Fr2, absolute values of difference values between the frames Fr2 and Fr3, and absolute values of difference values between the frames Fr3 and Fr4. The mask frame M1' has mask regions R1A' and R1B'. The mask frame M2' has mask regions R2A' and R2B'. The mask frame M3' has mask regions R3A' and R3B'. Herein, the mask regions R1A', R2A', and R3A' of the mask frames M1' to M3' correspond to regions of a moving body X0 in the frames Fr1 to Fr3, respectively. The mask regions R1B', R2B', and R3B correspond to regions of the moving body X0 in the adjacent frames.

The frames Fr1 to Fr3 are masked by using the corresponding mask frames M1' to M3', and the reference frame Fr4 is masked by using the reference mask frame Frc1. Accordingly, a moving body region corresponding to the moving body X0 are cut out from each of the plurality of frames Fr1 to Fr4. Specifically, as for the frame Fr1, regions, which correspond to the mask regions R1A' and R1B' having the pixel values of 1 in the mask frame M1', are cut out as moving body regions A1A' and A1B' (hereinafter, generically referred to as A1' occasionally). As for the frame Fr2, regions, which correspond to the mask regions R2A' and R2B' having the values of 1 in the mask frame M2', are cut out as moving body regions A2A' and A2B' (hereinafter, generically referred to as A2' occasionally). As for the frame Fr3, regions, which correspond to the mask regions R3A' and R3B' having the values of 1 in the mask frame M3', are cut out as moving body regions A3A' and A3B' (hereinafter, generically referred to as A3' occasionally).

Meanwhile, as for the reference frame Fr4, a region, which corresponds to the mask region R4A' having the value of 1 in the reference mask frame Frc1, is cut out as a moving body region A4A' (hereinafter, referred to as A4' occasionally).

Similar to the first embodiment, a cumulative frame Frc of the mask frames M1 to M3, which are calculated based on the absolute values of the difference values between each frame and the reference frame, is calculated. Then, the cumulative frame Frc is binarized to calculate the reference mask frame Frc1.

The moving body regions μl' to A4' are overwritten in chronological order at the positions corresponding to the moving body regions μl' to A4' in one of the frames Fr1 to Fr4 (herein, Fr1). Thus, a composite image G0' of the plurality of frames Fr1 to Fr4 is obtained.

Note that, in the fifth embodiment, the frame correcting means 11 calculates a mean value of pixel values, which indicates a level of the pixel values for each of the plurality of frames Fr1 to Fr4. The frame correcting means 11 corrects the pixel values of the plurality of frames Fr1 to Fr4 so that the mean values may substantially match. Accordingly, the entire brightness is substantially the same in each of the frames, and background regions which do not correspond to the moving body X0 will not have extremely large absolute values |di (x, y)|. Thus, the mask frames M1 to M3 having mask regions corresponding to only the moving body X0 are appropriately calculated. However, the same effects can be obtained by correcting the threshold Th1 used for the binarization by the binarizing means 2B of the first mask frame calculating means 2. Hereinafter, the correction of the threshold Th1 is described as a tenth embodiment.

Figure 30:
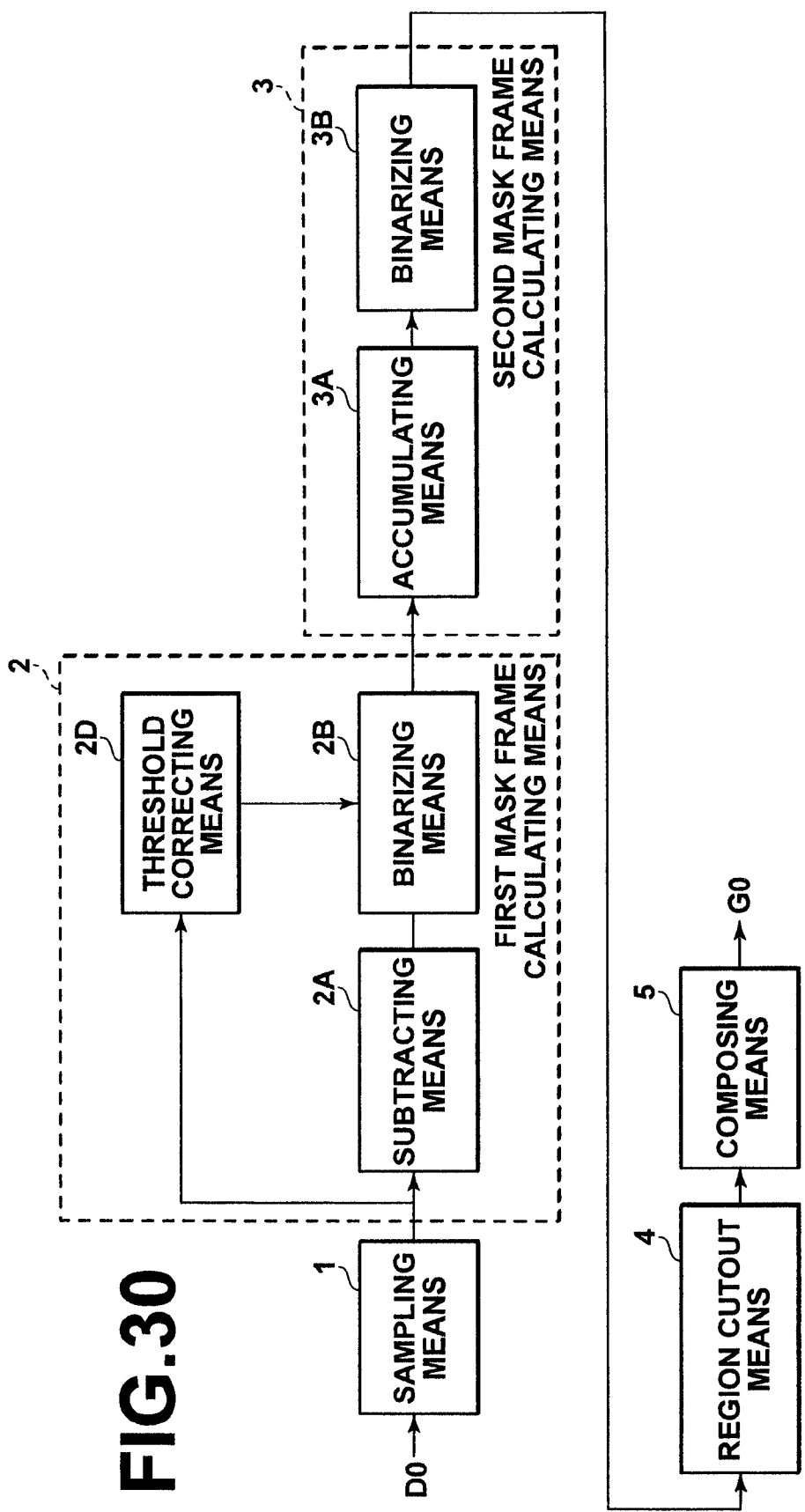
FIG. 30 is a schematic block diagram showing the configuration of a system for composing a moving image according to a tenth embodiment of the present invention, which includes a device for cutting out a moving image.

FIG. 30 is a schematic block diagram showing the configuration of a system for composing a moving image according to the tenth embodiment of the present invention, which includes a device for cutting out a moving image. Note that the components in the tenth embodiment, which are the same as those in the first embodiment, are given the same reference numerals, and details thereof are omitted.

The system for composing a moving image according to the tenth embodiment further comprises threshold correcting means 2D, in addition to the components in the first embodiment. The threshold correcting means 2D corrects a threshold Th1 for each absolute value |di (x, y)| of difference values. The threshold Th1 is used for the binarization by the binarizing means 2B of the first mask frame calculating means 2. Hereinafter, the correction of the threshold Th1 is described. Note that four frames Fr1 to Fr4 are also sampled from moving image data D0 in the tenth embodiment.

First, the threshold correcting means 2D calculates mean values FrM1 to FrM4 of all pixel values in the frames Fr1 to Fr3 and reference frame Fr4 by using the aforementioned equation (4). Absolute values of difference values between the mean value FrM4 of the reference frame Fr4 and the mean values FrM1 to FrM3 of the other frames Fr1 to Fr3 are calculated as correction coefficients αi (i=1 to 3) using the equation (6) below:

$$\alpha i = |FrM4 - FrMi| \quad (6).$$

Herein, the binarizing means 2B binarizes the absolute values |di (x, y)| of the difference values calculated by using the aforementioned equations (1) and (2) based on the threshold Th1. However, in the tenth embodiment, the threshold Th1 is corrected for each of the absolute values |di (x, y)| of the difference values to obtain a corrected threshold Th1'i (i=1 to 3). The binarization is performed based on the corrected threshold Th1'i. The corrected threshold Th1'i is calculated by using the equation (7) below:

$$Th1'i = Th1 + \alpha i \quad (7).$$

The binarizing means 2B binarizes the absolute values |di (x, y)| of the difference values based on the corrected threshold Th1'i. Specifically, a value of 1 is given to a pixel having the absolute value |di (x, y)| of the difference value larger than the threshold Th1'i. A value of 0 is given to a pixel having the absolute value less than or equal to the threshold Th1'i. Mask frames M1 to M3, which include pixels with a value of 1 as mask regions and correspond to the other frames Fr1 to Fr3, are calculated.

More specifically, the absolute value |d1 (x, y)| of the difference value calculated from the frame Fr1 and the reference frame Fr4 is binarized based on a corrected threshold Th1'1. The corrected threshold Th1'1 is calculated by correcting the threshold Th1 using the correction coefficient α1 obtained from the mean values FrM4 and FrM1. The absolute value |d2 (x, y)| of the difference value calculated from the frame Fr2 and the reference frame Fr4 is binarized based on a corrected threshold Th1'2. The corrected threshold Th1'2 is calculated by correcting the threshold Th1 using the correction coefficient a2 obtained from the mean values FrM4 and FrM2. The absolute value |d3 (x, y)| of the difference value calculated from the frame Fr3 and the reference frame Fr4 is binarized based on a corrected threshold Th1'3. The corrected threshold Th1'3 is calculated by correcting the threshold Th1 using the correction coefficient a3 obtained from the mean values FrM4 and FrM3.

Note that, in the tenth embodiment, the mean values of the frames Fr1 to Fr4 are calculated to obtain the correction coefficient αi. However, instead of the mean values, any values representing all the pixels in the frames Fr1 to Fr4, such as median values of all the pixels and the maximum frequency values of the histogram, may be used.

Moreover, in the tenth embodiment, when luminance and chrominance components YCC form the frames Fr1 to Fr4, the threshold Th1 may be corrected by calculating the correction coefficient αi in terms of only the Y component, instead of all the components.

Note that the systems in the aforementioned first to third embodiments, fifth, sixth, eighth, and ninth embodiments may comprise at least one means among the aligning means 10, the frame correcting means 11, and the filtering means 2C.

In addition, the system in the tenth embodiment may comprise either the aligning means 10 or the filtering means 2C.

What is claimed is:

1. A device for cutting out a moving image, the device comprising:

sampling means for sampling a plurality of sequential frames from the moving image including a moving body;

mask frame calculating means for calculating mask frames, which include mask regions for identifying positions of the moving body in the plurality of frames, corresponding to each of the plurality of frames;

region cutout means for cutting out at least one moving body region corresponding to the moving body from all or part of the plurality of frames by masking all or part of the plurality of frames using the mask frames which correspond thereto; and display means for displaying the at least one moving body region cut out by the region cutout means, wherein the mask frame calculating means includes:

first mask frame calculating means for calculating other mask frames, which includes the mask regions for identifying the positions of the moving body in other frames, corresponding to each of the other frames by calculating the absolute values of difference values in corresponding pixels between a reference frame selected from the plurality of frames and the other frames and by binarizing the absolute values based on a first threshold; and second mask frame calculating means for calculating a reference mask frame, which includes a mask region for identifying a position of the moving body in the reference frame, based on information on the plurality of other mask frames, and wherein the region cutout means includes a means for cutting out a moving body region corresponding to the moving body from the reference frame by masking the reference frame.

2. A device for cutting out a moving image according to claim 1, wherein the mask frame calculating means is a means for filtering the absolute values of the difference values to remove noise and binarizing the absolute values which have been filtered.

3. A device for cutting out a moving image according to claim 2, further comprising:

threshold correcting means for calculating a representative value of pixel values indicating a level of the pixel values in each of the plurality of frames to correct the first threshold for each of the absolute values of the difference values based on the representative value, wherein the mask frame calculating means is a means for binarizing the absolute values based on the first threshold corrected for each of the absolute values of the difference values.

4. A device for cutting out a moving image according to claim 3, wherein the first threshold is obtained by deducting a predetermined parameter value from the number of the plurality of frames.

5. A device for cutting out a moving image, the device comprising:

sampling means for sampling a plurality of sequential frames from the moving image including a moving body;

mask frame calculating means for calculating mask frames, which include mask regions for identifying positions of the moving body in the plurality of frames, corresponding to each of the plurality of frames;

region cutout means for cutting out at least one moving body region corresponding to the moving body from all or part of the plurality of frames by masking all or part of the plurality of frames using the mask frames which correspond thereto; and display means for displaying the at least one moving body region cut out by the region cutout means, wherein the mask frame calculating means includes:

first mask frame calculating means for calculating other mask frames, which includes the mask regions for identifying the positions of the moving body in other frames, corresponding to each of the other frames by calculating the absolute values of difference values in corresponding pixels between a reference frame selected from the plurality of frames and the other frames and by binarizing the absolute values based on a first threshold; and second mask frame calculating means for calculating a reference mask frame, which includes a mask region for identifying a position of the moving body in the reference frame, based on information on the plurality of other mask frames, and wherein the region cutout means includes a means for cutting out the at least one moving body region corresponding to the moving body from the plurality of frames by masking the other frames using the other mask frames which correspond thereto and by masking the reference frame using the reference mask frame.

6. A device for cutting out a moving image according to claim 5, wherein the first mask frame calculating means is a means for filtering the absolute values of the difference values to remove noise and binarizing the absolute values which have been filtered.

7. A device for cutting out a moving image according to claim 5, further comprising:

threshold correcting means for calculating s representative value of pixel values indicating a level of the pixel values in each of the plurality of frames to correct the first threshold for each of the absolute values of the difference values based on the representative value, wherein the first mask frame calculating means is a means for binarizing the absolute values based on the first threshold corrected for each of the absolute values of the difference values.

8. A device for cutting out a moving image according to claim 5, wherein the second mask frame calculating means is a means for calculating the reference mask frame by accumulating or weighting and accumulating corresponding pixels in a selection mask frame selected from the plurality of other mask frames and further binarizing the accumulated selection mask frame based on a second threshold.

9. A device for cutting out a moving image according to claim 8, further comprising:

selecting means for comparing a size of the mask region in each of the other mask frames with a third threshold to select the other mask frame with the mask region having the size exceeding the third threshold as the selection mask frame.

10. A device for cutting out a moving image according to claim 9, wherein the second mask frame calculating means is a means for filtering the accumulated selection mask frame to remove noise and binarizing the accumulated selection mask frame which has been filtered.

11. A device for cutting out a moving image according to claim 10, wherein the second mask frame calculating means is a means for re-calculating the reference mask frame by calculating color information on a region in the reference frame, which corresponds to the mask region in the reference mask frame; weighting the region in the accumulated selection mask frame, which corresponds to a region having color information similar to the color information; and binarizing the weighted and accumulated selection mask frame based on the second threshold.

12. A device for cutting out a moving image according to claim 5, wherein the first threshold is obtained by deducting a predetermined parameter value from the number of the plurality of frames.

13. A method for cutting out a moving image, the method comprising the steps of:

sampling a plurality of sequential frames from the moving image including a moving body;

calculating mask frames, which include mask regions for identifying positions of the moving body in the plurality of frames, corresponding to each of the plurality of frames by calculating other mask frames, which includes the mask regions for identifying the positions of the moving body in other frames, corresponding to each of the other frames, the other mask frames being calculated by calculating the absolute values of difference values in corresponding pixels between a reference frame selected from the plurality of frames and the other frames and by binarizing the absolute values based on a first threshold, and by calculating a reference mask frame, which includes a mask region for identifying a position of the moving body in the reference frame, based on information on the plurality of other mask frames;

cutting out at least one moving body region corresponding to the moving body from all or part of the plurality of frames by masking all or part of the plurality of frames using the mask frames which correspond thereto, wherein a moving body region corresponding to the moving body is cut out from the reference frame by masking the reference frame using the reference mask frame; and displaying the at least one moving body region that has been cut out.

14. A method for cutting out a moving image, the method comprising the steps of:

sampling a plurality of sequential frames from the moving image including a moving body;

calculating mask frames, which include mask regions for identifying positions of the moving body in the plurality of frames, corresponding to each of the plurality of frames by calculating other mask frames, which includes the mask regions for identifying the positions of the moving body in other frames, corresponding to each of the other frames, the other mask frames being calculated by calculating the absolute values of difference values in corresponding pixels between a reference frame selected from the plurality of frames and the other frames and by binarizing the absolute values based on a first threshold, and by calculating a reference mask frame, which includes a mask region for identifying a position of the moving body in the reference frame, based on information on the plurality of other mask frames;

cutting out at least one moving body region corresponding to the moving body from all or part of the plurality of frames by masking all or part of the plurality of frames using the mask frames which correspond thereto, wherein the at least one moving body region corresponding to the moving body from the plurality of frames is cut out by masking the other frames using the other mask frames which correspond thereto and by masking the reference frame using the reference mask frame; and displaying the at least one moving body region that has been cut out.

15. A computer-readable recording medium having stored therein a program for causing a computer to execute the procedures of:

sampling a plurality of sequential frames from the moving image including a moving body;

calculating mask frames, which include mask regions for identifying positions of the moving body in the plurality of frames, corresponding to each of the plurality of frames by calculating other mask frames, which includes the mask regions for identifying the positions of the moving body in other frames, corresponding to each of the other frames, the other mask frames being calculated by calculating the absolute values of difference values in corresponding pixels between a reference frame selected from the plurality of frames and the other frames and by binarizing the absolute values based on a first threshold, and by calculating a reference mask frame, which includes a mask region for identifying a position of the moving body in the reference frame, based on information on the plurality of other mask frames;

cutting out at least one moving body region corresponding to the moving body from all or part of the plurality of frames by masking all or part of the plurality of frames using the mask frames which correspond thereto, wherein a moving body region corresponding to the moving body is cut out from the reference frame by masking the reference frame using the reference mask frame; and displaying the at least one moving body region that has been cut out.

16. A computer-readable recording medium having stored therein a program for causing a computer to execute the procedures of:

sampling a plurality of sequential frames from the moving image including a moving body;

calculating mask frames, which include mask regions for identifying positions of the moving body in the plurality of frames, corresponding to each of the plurality of frames by calculating other mask frames, which includes the mask regions for identifying the positions of the moving body in other frames, corresponding to each of the other frames, the other mask frames being calculated by calculating absolute values of difference values in corresponding pixels between a reference frame selected from the plurality of frames and the other frames and by binarizing the absolute values based on a first threshold, and by calculating a reference mask frame, which includes a mask region for identifying a position of the moving body in the reference frame, based on information on the plurality of other mask frames;

cutting out at least one moving body region corresponding to the moving body from all or part of the plurality of frames by masking all or part of the plurality of frames using the mask frames which correspond thereto, wherein the at least one moving body region corresponding to the moving body from the plurality of frames is cut out by masking the other frames using the other mask frames which correspond thereto and by masking the reference frame using the reference mask frame; and displaying the at least one moving body region that has been cut out.

* * * * *